US010552839B2

(12) United States Patent
Narasimhan

(10) Patent No.: US 10,552,839 B2
(45) Date of Patent: Feb. 4, 2020

(54) INTUITIVE REAL-TIME MONEY MANAGEMENT DASHBOARD

(71) Applicant: PAYPAL, INC., San Jose, CA (US)

(72) Inventor: Srivathsan Narasimhan, Saratoga, CA (US)

(73) Assignee: PayPal, Inc., San Jose, CA (US)

(*) Notice: Subject to any disclaimer, the term of this patent is extended or adjusted under 35 U.S.C. 154(b) by 693 days.

(21) Appl. No.: 14/794,418

(22) Filed: Jul. 8, 2015

(65) Prior Publication Data

US 2017/0011398 A1 Jan. 12, 2017

(51) Int. Cl.
*G06Q 40/00* (2012.01)
*G06Q 20/40* (2012.01)

(52) U.S. Cl.
CPC .................... *G06Q 20/405* (2013.01)

(58) Field of Classification Search
CPC .................................................. G06Q 20/405
See application file for complete search history.

(56) References Cited

U.S. PATENT DOCUMENTS

| 2010/0070402 | A1* | 3/2010 | Friesen | G06Q 20/10 705/37 |
| 2011/0087985 | A1* | 4/2011 | Buchanan | G06F 3/04847 715/771 |
| 2014/0222669 | A1* | 8/2014 | Novak | G06Q 20/14 705/40 |

* cited by examiner

*Primary Examiner* — Arunava Chakravarti
(74) *Attorney, Agent, or Firm* — Haynes and Boone LLP

(57) ABSTRACT

There are provided systems and methods for providing an interactive transaction dashboard. An exemplary system includes a first data store storing and a processing device in communication with the first data store. The processing device receives, over a network communication link, authentication information associated with a user device operated by the first user and transmits transaction data associated with a first transaction to be rendered in a graphical user interface provided by the user device, the graphical user interface visually depicting the first transaction as an icon positioned along a visual axis element representing a period of time. The processing device receives a command generated by an interaction of the first user with the icon and transmits secondary transaction data associated with the first transaction to be rendered in the graphical user interface, the secondary transaction data being responsive to the command.

20 Claims, 15 Drawing Sheets

INTUITIVE REAL-TIME MONEY MANAGEMENT DASHBOARD

TECHNICAL FIELD

Embodiments disclosed herein are related to systems and methods for providing a graphical user interface for a personal cash flow manager for transaction creation and management.

BACKGROUND

The management of personal and or professional transaction information is important to optimize the use of resources and avoid problems that can result from mismanagement of those resources. Many people perform transactions through a variety of platforms and/or with a variety of counterparties, entities including individuals and businesses, on any given day. Many people routinely use various forms of payments methods, such as bank transfers, paper checks, credit cards, debit cards, cash, and application-based payments, etc., and make and receive payments to and from individuals and small and large businesses. However, making sure that a person receives what is expected of others and making sure that person pays what is expected by others by the due date can be complicated. While each many financial institutions provide interfaces by which people can obtain some information regarding their transactions, attempts at consolidating this information in a meaningful way is a continuing challenge. Additionally, for those that are "unbanked" or "underbanked", e.g., those that do not use checking accounts or credit accounts, monitoring and managing cash flow at all times can be even more difficult.

Figure 1:
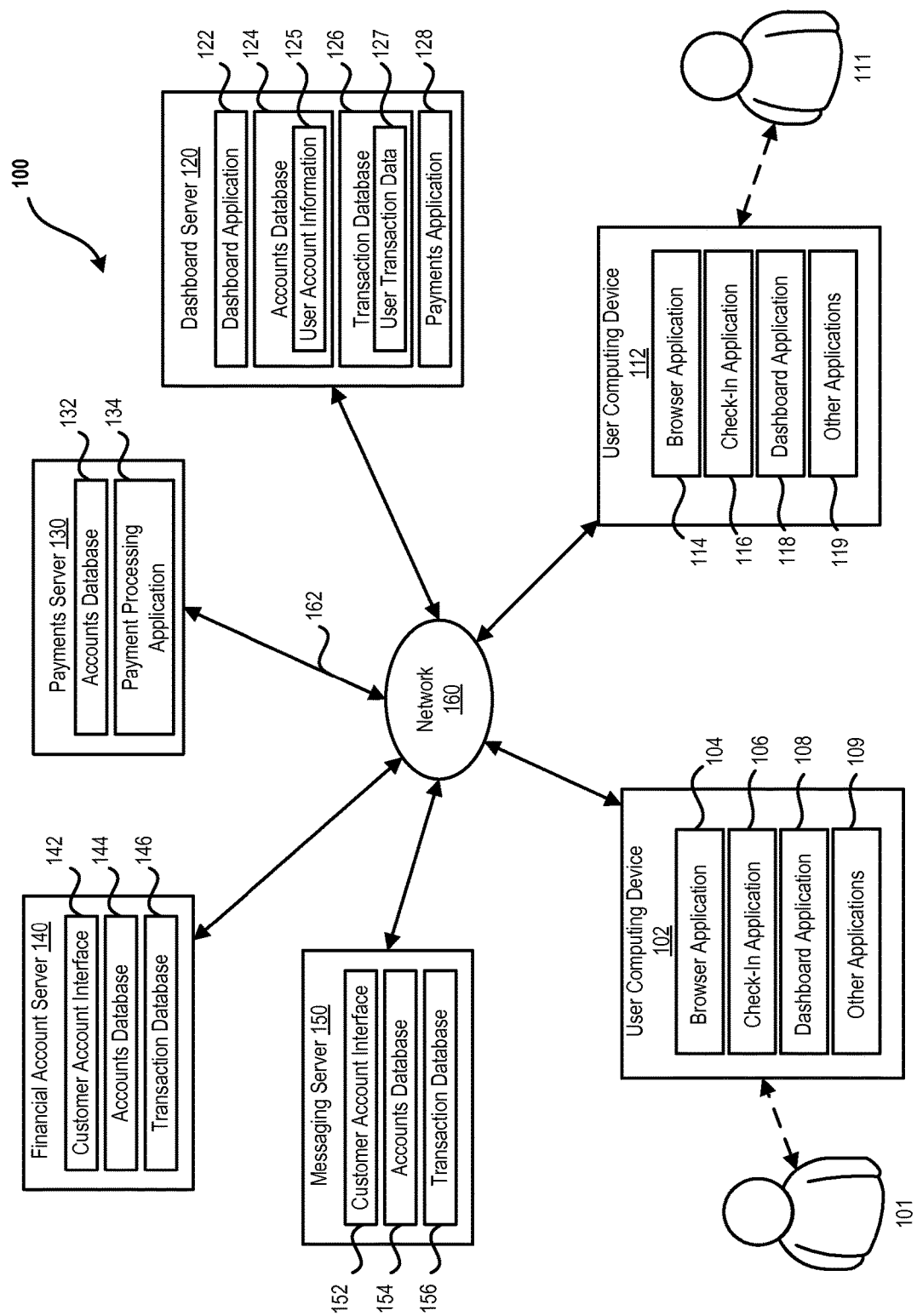
FIG. 1 is a block diagram of a networked system, consistent with some embodiments.

In the drawings, elements having the same designation have the same or similar functions.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

There is a need to provide people with an improved set of tools for managing their financial lives. While substantial efforts have been made and are being made to improve the financial literacy and numeracy of domestic and international populations, a standard spreadsheet-like system for managing and unintuitive transactions may be overwhelming to some people. However, the ability to appropriately handle one's finances can provide significant benefits such as better budgeting, better awareness of spending, and a clearer picture of one's financial standing both now and in the future. Similarly, when personal or professional finances are not handled appropriately, opportunities may be lost, inappropriate decisions may be made, and penalties such as late fees or overdraft fees can compound.

The following description introduces a simplified and centralized money management dashboard that enables users to interactively understand and perform transactions. This interactive transaction dashboard presents transactions in an intuitive graphical user interface presenting a series of transactions, whether payments to the user from others or payments owed by the user to others, as discrete events occurring in a clear perspective of time. As shown in many of the figures described herein presenting an exemplary graphical user interface or interfaces, the transactions may appear as points on a timeline that can be specified and manipulated by the user. The interactive transaction dashboard may further enable users to generate bills, invoices, or other requests for payment from other users or potential users and also may enable users to submit payments to businesses and individuals using a variety of financial instruments associated with the user's financial accounts, such as a credit card account, a checking account, a savings account, an investment account, or a third-party payment account having a balance or a line of credit associated with it.

Each transaction may be represented by an icon in the graphical user interface that may be selected to provide the user with additional information and with a plurality of interface elements associated with commands or actions the user may desire to take in view of the transaction. For example, if the transaction represents a bill or debt the user needs to pay, by selecting the associated icon, the user may be presented with one or more payment options whereby the user may pay the bill through the interactive dashboard. Additionally, in some embodiments, the user may be able to send payment in check-form even without having a checking account. For example, the provider of the interactive dashboard may access, with the user's permission, the financial account of the user to withdraw funds that the provider then uses to send a paper check or an electronic check on behalf of the user. Accordingly, the interactive dashboard may enable a user without a checking account to send checks easily and quickly using the interactive dashboard.

Additionally, the user of the interactive dashboard may be provided with information visually depicting the user's cash flow over a historical period of time (e.g., the preceding month) and a prediction of the user's cash flow over a future period of time (e.g., the following month) based on the user's represented payment obligations, both payment obligations to the user and payment obligations of the user to others. Additional financial information may be presented to the user, such as current account balances and projected account balances, which may be communicated to the user individually or collectively.

The user may also interact with other users via a messaging system or message exchange system that associates messages, message threads, chats, or chat sessions with specific transactions. For example, a user that teaches violin lessons may use the system to create and monitor transactions that describe payment obligations of the first user's violin students. When the user is not able to teach a scheduled session, that user may interact with the associated transaction icon to communicate with the student (who is also a user of the interactive dashboard) regarding cancellation. The student may communicate, in a messaging session associated with the transaction, a request that the teacher adjust the amount due or cancel that particular transaction. When the user student pays for a lesson, the icon associated with that transaction may change colors (e.g., from red to green) to indicate that payment has been received. In this way, the user may visualize in "roadmap" fashion what payments are due, which of those payments have been paid, which payments have been sent, which payments are not yet due and whether any of those payments have already been made. The icons representing each payment obligation or transaction may visually change to communicate information such as payment status or payment amount. For example, an icon representing a large bill (such as for an amount above a dollar amount set by the user or the system) may appear larger than an icon representing a small bill (such as for an amount below a dollar amount set by the user or the system, which may be the same or different amount as for the "large" bill threshold) in the graphical user interface. Similarly, an icon representing a large receipt, such as a paycheck, may be larger than an icon representing a payment from a friend for a movie ticket the user bought on behalf of a friend.

Embodiments consistent with this disclosure may allow a user to interactively view transactions from one or more accounts in a graphical user interface. In some embodiments, the user may also be able to pay bills, etc., and request payments from others.

FIG. 1 is a block diagram of a networked interactive dashboard system 100, consistent with some embodiments that include a plurality of networked computing devices that cooperate to provide certain features described herein. System 100 includes two exemplary user computing devices referred to herein as a first user device 102 and a second user device 112. As shown in FIG. 1, the user device 102 is associated with and/or operated by a user 101 while the user device 112 is associated with and/or operated by a user 111. The system 100 further includes a dashboard server 120 (or a dashboard provider server 120), a payments server 130, an exemplary financial account server 140, and a messaging server 150. These systems are illustrated as being in communication with each other via a network 160.

User computing devices 102 and 112 (or simply user devices 102 and 112) may each be a mobile device such as a smartphone, a tablet computer, a laptop or netbook, and the like. User devices 102 and 112 may each also be a personal computer, a set-top box (STB) such as provided by cable or satellite content providers, a video game system console, or a smart or internet-enabled television, in some embodiments. User devices 102 and 112 may each also be a head-mounted display (HMD) or other wearable computing device. In some embodiments, user computing device 102 may be implemented in an automobile, for example in an entertainment center or console of an automobile, or is included or implemented in a healthcare device. User devices 102 and 112 may be implemented using any appropriate combination of hardware and/or software configured for wired and/or wireless communication over network 160. Descriptions herein regarding the features and capabilities of the user device 102 are equally applicable to the user device 112, which may be a similar, but different device. For example, the user device 102 may be a smartphone while the user device 112 is a tablet computer.

Consistent with some embodiments, user computing device 102 may include any appropriate combination of hardware and/or software having one or more processing devices, such as a microcontroller or a processor, and capable of reading instructions stored on a non-transitory machine-readable medium or a non-transitory memory for execution by the one or more processing devices. Some embodiments of the user device 102 may include a global position system receiver to provide location information of the user device 102 to one or more subsystems or to a remote system, like the dashboard server 120 or the payments server 130, for example. The user device 102 may further include a plurality of communication interfaces, with associated hardware and/or software, such as cellular transceiver, near-field communication (NFC) transceiver, etc.

Consistent with some embodiments, user device 102 includes one or more machine-readable media or data stores, such as a memory (not shown) that includes instructions for execution by one or more processors (not shown) for causing user computing device 102 to perform specific tasks. Some common forms of machine-readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which one or more processors or computer is adapted to read. Instructions stored on the machine-readable media may include instructions for authenticating user device 102 to dashboard server 120, payments server 130, financial account server 140 or a plurality of such servers, and messaging server 150 to access services provided by these respective devices or systems, to provide information about the user 101 to any or all of these servers, and/or conducting transactions with other users of these servers to the provisioning of a graphical user interface for an inter-active transaction dashboard providing a large amount of information in a unique graphical format and for performing financial transactions on behalf of the user 101.

The instructions on the machine-readable media of the user devices 102 and 112 may include instructions for displaying content or performing activities by particular applications or "apps" stored in a memory of respective user device and executed by one or more processing devices executing in user computing device 102. Exemplary applications may include a browser application 104 that displays content, such as a web page or a user interface using a browser, a check-in application 106 that may be used in conjunction with dashboard server 120 to provide information to the user 101 with an interface transaction dashboard as described herein. Browser application 104 may be implemented as a web browser to view information available over network 160. Browser application 104 may include instructions executable by one or more processors for interfacing and communicating with dashboard server 120, the payments server 130, the financial account server 140, and/or the messaging server 150, or other servers via network 160. For example, user 101 may be able to access websites using browser 104 to find and purchase items from merchant server through a payment server 130, such as PayPal®, as well as access user account information or web content. In some embodiments, user 101 may be able to use the check-in application 106 to check into a retailer location or online store and to pay for items, with the payments being processed by dashboard server 120. In some embodiments, check-in application 106 may be able to interact with the payments server 130 and/or dashboard server 120 to trigger the inclusion of users of those servers in lists of users with which the user 101 may interact. For example, the payments server 130 may provide a list to the user device 102 of other users or other entities that the user can to send payments to or from which the user 101 could receive payments. The check-in application 106 may rely on a location-based computing device, such as a device installed at a specific retail location for example that is capable of shorter range wireless communication, or may rely on the location information available to the user device 102 via access to the global position system or through cell-tower triangulation, etc.

The user device 102 includes a dashboard application 108 that is configured to interface with the dashboard server 120 to receive information therefrom and to render that information in a graphical user interface with which the user 101 can interact to perform a variety of operations and receive and manipulate information. The dashboard application 108 may allow for an interface between the user device 102 and the dashboard server 120 through which the user device 102 may be authenticated to the dashboard server 120 and vice versa. Other applications 109 may be desired in one or more embodiments to provide additional features available to user 101. For example, other applications 109 may include mobile apps downloaded and resident on user computing device 102 that enable user 101 to access content through the apps.

As noted, the user device 112 is similar in many respects to the user device 102. For example, the user device 112 includes a browser application or browser 114, a check-in-application 116, a dashboard application 118, and other applications 119. The applications are similar to the browser 104, the check-in application 106, the dashboard application 108, and the other applications 109 described with respect to user device 102.

The user devices 102 and 112 are able to communicate with the dashboard server 120 over the network 160. According to some embodiments, the dashboard server 120 may be maintained by an online payment provider or other service provider, such as PayPal, Inc. of San Jose, Calif., which may provide the interactive transactions dashboard for the user 101.

As illustrated in FIG. 1, the dashboard server 120 includes a dashboard application 122 which may provide an interface through which the user devices 102 and 112 can communicate with the dashboard server 120. The dashboard server 120 further includes an accounts database 124 that includes user account information 125 for a plurality of users. Each user of the dashboard server 120 may have an individual account that can be accessed upon authentication to the dashboard server 120. For example, the user 101 may manipulate the user device 102 to cause the dashboard application 108 to send authentication information to the dashboard server 120. The dashboard application 122 may use the authentication information, which may include a username, password, a personal identification number, or other user identifying information, to allow the user device 102 to access user account information 125 associated with the user 101 in the accounts database 124. The user information 125 may include information such as login information allowing the dashboard server 120 to communicate with the payment server 130, one or more financial account servers like the financial account server 140, and the messaging server 150. For example, the dashboard server 120 may use login information associated with the user 101 to communicate through network 160 with the financial account server 140 to access transaction information stored therein or to facilitate the transfer of funds to or from an account of the user 101 with the institution that owns or operates the financial account server 140, such as a bank or credit union. In some embodiments, the dashboard server 120 retrieves user transaction data from the financial account server 140 and stores it in a transaction database 126 as user transaction data 127. The user transaction data 127 may include a plurality of payments to or payments from the user account of the user 101 on the financial account server 140. For example, the user transaction data may include a date, a time, an amount, and a description of the user transaction such as the purchase of dog food at a pet store. Accordingly, the user transaction data item associated with this transaction includes the time and date of the transaction, as well as the amount spent on the dog food and/or any other items purchased at the same time by the user 101. User transaction data may also identify the pet store. Many such user transaction data items may be included in the transaction database 126. For example hundreds or thousands of user transaction data items may be included in the user transaction data 127 for each user of the dashboard server 120.

As illustrated, the dashboard server 120 includes a payments application 128 that may enable the user 101 to make payments or receive payments through the dashboard application 108 running on the user device 102. For example, the user 101 may make a request through the dashboard application 108 on the user device 102 to pay back the user 111 who paid for their lunch. The payments application 128 may communicate with the dashboard application 108 to receive the request or command from the user 101. Thereafter, the payments application 128 may access funds associated with user 101 and provide those funds into an account associated with the user 111. The funds may be transferred to an account of the user 111 on the financial account server 140 (e.g., a bank account such as a checking account or savings account) or to a different payments account. The payments application 128 may thereafter communicate with the dashboard application 118 running on the user device 112 to communicate to the user 111 in a graphical user interface that funds have been received from the user 101. For example, a notification such as a push notification may be provided on the user device 112 to communicate this information to the user 111. In such embodiments where a push notification is sent and received, the system 100 may further include a push notification server configured to communicate with the dashboard server 120 and the user devices 102 and 112. In some embodiments, the payments application 128 may facilitate transactions between users of the dashboard server 120. In other embodiments, the payments application 128 may interact with a third-party payment server, such as the payment server 130 to enact the exchange of funds from an account associated with user 101 to an account associated with the user 111.

As illustrated, the payment server 130 is able to communicate with the other devices illustrated in the system 100 via a network communication link with the network 160. The payments server 130 may be maintained by an online payment provider or other service provider, such as PayPal, Inc. of San Jose, Calif., which may provide for the initiation and processing of payments. In some embodiments, the dashboard server 120 and the payment server 130 may be integrated together and provided by a single server or single set of servers. The payment server 130 includes an accounts database 132 that includes account information for each of the users of the payment server 130. The payment server 130 further includes a payment processing application 134 that is configured to process payment requests to transfer funds from an account associated with a first user to an account associated with a second user. In some embodiments, the account of the first user may be an account associated with the payment server 130 or with an operator of the payment server 130. Similarly, the account of the second user may be an account associated with the payment server 130 or with an operator of the payment server 130. In other embodiments, one or both of the accounts may be accounts associated with an entity or entities other than the operator of the payment server 130. For example, the payment processing application 134 of the payment server 130 may be able to access funds of the first user and/or the second user that are associated with the financial account server 140 and an operator thereof.

The financial account server 140 may be operated by an entity, such as a bank or credit card company, other than an operator of the dashboard server 120 and/or the payment server 130. In other embodiments, the dashboard server 120 to payment server 130 and the financial account server 140 may be integrated together and provided by a single entity. The financial account server 140 includes a user account interface 142 through which users such as the user 101 and/or the user 111 may access account information stored in the accounts database 144. The accounts database 144 may include one or more accounts for each user of the financial account server 140. The financial account server 140 may additionally include a transaction database 146 that includes user transaction data for a plurality of transactions associated with accounts of users of the financial account server 140. In some embodiments, the financial account server 140 may respond to requests from the dashboard server 120 for user transaction data associated with a particular user. The dashboard server 120 may use authentication information provided by the user 101 from the user device 102 or another device to authenticate the dashboard server 120 to the financial account server 140, thereby enabling the dashboard server 120 to collect user transaction data for the user 101, for example. While a single financial account server 140 is illustrated as being included in the system 100, embodiments of the system 100 may include many more financial account servers 140 associated with many different financial entities, such as banks, credit unions, retirement firms, investment firms, or another financial services provider. For example, the user 101 and/or the user 111 may have checking accounts, credit card accounts, debit card accounts, savings accounts, investment accounts, etc., each through a different financial services provider. The dashboard server 120 may access servers of any of these different financial services providers in order to access user transaction data for inclusion in an interactive transaction dashboard provided by the dashboard server 120.

The system 100 may further include a messaging server 150 that enables the user 101 to communicate with the user 111 through the user device 102 and the user device 112. In some embodiments, one of the other applications 109 may be a messaging application that interacts with a user account interface 152 of the messaging server to control access to a messaging account listed or included in the accounts database 154 for each user of the messaging server 150. Messages transmitted by the user 101 through the user device 102 may be received by the messaging server 150 and relate to the user device 112 for communication to the user 111. In some embodiments, dashboard server 120 may include payments application 128, which may be adapted to interact with user device 102 and merchant server 104 to process payments to be made by dashboard server 120 for items purchased by user 101 using user device 102, including items purchased from the merchant location using the merchant server 104. In some embodiments, the messaging server 150 may include a transaction database 156 having a plurality of transaction identifiers such that messages sent by users of the messaging server 150 may be associated with a particular transaction. For example, after the user 111 receives a notification on the user device 112 that funds have been deposited into his or her account from the user 101, the user 111 may use the computing device 112 to send a message via messaging server 150 to the user 101 regarding the deposit. For example, the user 111 may send a message that says, "Thank you!" or "That's too much, I'll send back $20, and we will call it even" or another message. The user 101 will receive that message in such a way that the association between the message and the deposit is clearly communicated. For example, the message may appear under a thread identified by the deposit. In some embodiments, the dashboard server 120, the payment server 130, and messaging server 150 may be integrated into a single interactive transaction dashboard provisioning server or system operated by a single entity.

As described above, the devices illustrated in the embodiment of the system 100 communicate by respective network communication links 162 to the network 160. The network 160, in one embodiment, may be implemented as a single network or a combination of multiple networks. For example, in various embodiments, network 160 may include the Internet and/or one or more intranets, landline networks, wireless networks, and/or other appropriate types of communication networks. In another example, network 160 may comprise a wireless telecommunications network (e.g., cellular phone network) adapted to communicate with other communication networks, such as the Internet.

Although discussion has been made of applications and applications on user devices 102 and 112, dashboard server 120, payments server 130, financial account server 140, and the messaging server 150, the servers may also be, in some embodiments, modules. Module, as used herein, may refer to a software module that performs a function when executed by one or more processing devices or Application Specific Integrated Circuit (ASIC) or other circuit having memory and at least one processor for executing instructions to perform a function, such as the functions described as being performed by the applications.

Figure 2:
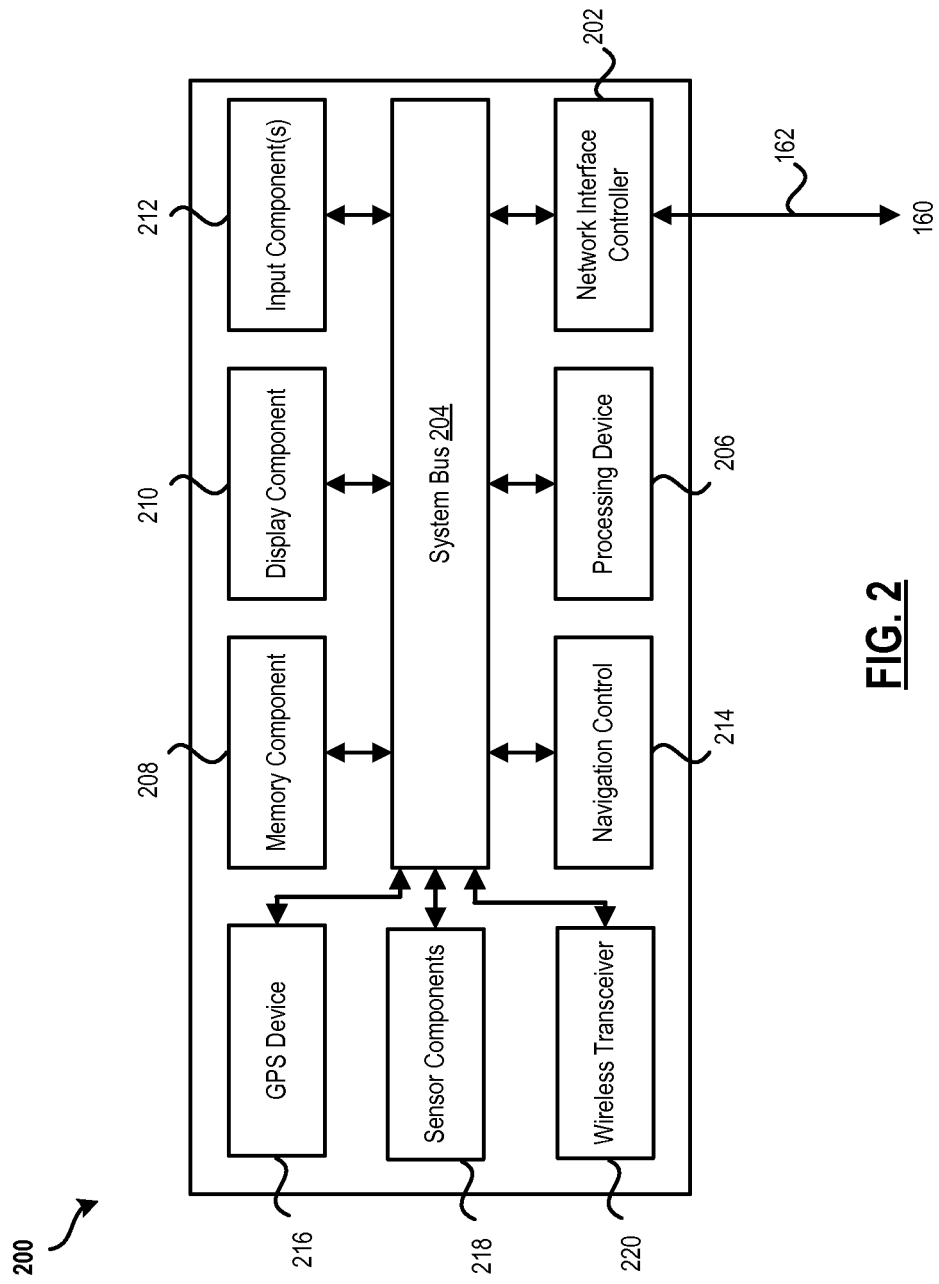
FIG. 2 is a diagram illustrating a computing device, consistent with some embodiments.

FIG. 2 is a diagram illustrating computing system 200, which may correspond to any of the user computing devices 102 and 112, dashboard server 120, payments server 130, financial account server 140, or the messaging server 150 consistent with some embodiments. Thus, the computing system 200 may be a mobile device such as a smartphone, a tablet computer, a personal computer, laptop computer, netbook, or tablet computer, set-top box, video game console, smart watch, head-mounted display (HMD) or other wearable computing device as would be consistent with user computing device 102. Further, the computing system 200 may also be a server or one server amongst a plurality of servers, as would be consistent with dashboard server 120, payments server 130, financial account server 140, messaging server 150, and/or combinations thereof. As shown in FIG. 2, computing system 200 includes a network interface component (NIC) 202 configured for communication with a network such as network 160 shown in FIG. 1 via a network communication link 162, which may represent a wired or a wireless connection. Consistent with some embodiments, NIC 202 includes a wireless communication component, such as a wireless broadband component, a wireless satellite component, or various other types of wireless communication components including radio frequency (RF), microwave frequency (MWF), Bluetooth Low Energy (BLE), and/or infrared (IR) components configured for communication with network 160. Consistent with other embodiments, NIC 202 may be configured to interface with a coaxial cable, a fiber optic cable, a digital subscriber line (DSL) modem, a public switched telephone network (PSTN) modem, an Ethernet device, and/or various other types of wired and/or wireless network communication devices adapted for communication with network 160.

Consistent with some embodiments, computing system 200 includes a system bus 204 for interconnecting various components within computing system 200 and communicating information between the various components. Such components include a processing device 206, which may be one or more processors, micro-controllers, graphics processing units (GPUs) or digital signal processors (DSPs), and a data store or memory component 208, which may correspond to a random access memory (RAM), an internal memory component, a read-only memory (ROM), or an external or static optical, magnetic, or solid-state memory. Consistent with some embodiments, computing system 200 further includes a display component 210 for displaying information to a user 101 of computing system 200. Display component 210 may be a liquid crystal display (LCD) screen, an organic light emitting diode (OLED) screen (including active matrix AMOLED screens), an LED screen, a plasma display, or a cathode ray tube (CRT) display. Computing system 200 may also include an input component 212, allowing for a user of computing system 200, such as user 101, to input information to computing system 200. Such information could include payment information such as an amount required to complete a transaction, account information, authentication/identification information such as a credential, a key, a username, a password, a personal identification number, biometric information, etc. An input component 212 may include multiple components, for example, a keyboard or key pad, whether physical or virtual, a mouse, a touch screen, a microphone, an eye tracking system, and combinations thereof. Computing system 200 may further include a navigation control component 214, configured to allow a user to navigate along display component 210. Consistent with some embodiments, navigation control component 214 may be a mouse, a trackball, or other such device. Moreover, when system 200 includes a touch screen, display component 210, input component 212, and navigation control component 214 may be a single integrated component, such as a capacitive sensor-based touch screen.

Computing system 200 may further include a location component 216 for determining a location of computing system 200. In some embodiments, location component 216 may correspond to a GPS transceiver that is in communication or able to communicate with one or more GPS satellites. In other embodiments, location component 216 may be configured to determine a location of computing system 200 by using an internet protocol (IP) address lookup, or by triangulating a position based on nearby telecommunications towers or wireless access points (WAPs). Location component 216 may be further configured to store a user-defined location in memory component 208 that can be transmitted to a third party for the purpose of identifying a location of computing system 200, from which a location of the user 101 of the computing system 200 may be inferred. Computing system 200 may also include sensor components 218. Sensor components 218 provide sensor functionality, and may correspond to sensors built into user computing device 102 or sensor peripherals coupled to user computing device 102. Sensor components 218 may include any sensory device that captures information related to user 101 and/or user computing device 102 that may be associated with any actions that user 101 performs using user computing device 102. Sensor components 218 may include camera and imaging components, accelerometers, biometric readers, motion capture devices, and other devices that are capable of providing information about user computing device 102 and/or the user 101, or an environment therearound. Computing system 200 may also include one or more wireless transceivers 220 that may each include an antenna that is separable or integral and is capable of transmitting and receiving information according to one or more wireless network protocols, such as Wi-Fi™, 3G, 4G, HDSPA, LTE, RF, NFC, IEEE 802.11a, b, g, n, ac, or ad, Bluetooth®, BLE, WiMAX, ZigBee®, etc.

Computing system 200 may perform specific operations by processing device 206 executing one or more sequences of instructions contained memory component 208. In other embodiments, hard-wired circuitry may be used in place of or in combination with software instructions to implement the present disclosure. Logic may be encoded in a computer-readable or machine-readable medium, which may refer to any medium that participates in providing instructions to processing device 206 for execution, including memory component 208. Consistent with some embodiments, the computer readable medium is tangible and non-transitory. In various implementations, non-volatile media include optical or magnetic disks, volatile media includes dynamic memory. Some common forms of computer-readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instructions to practice the present disclosure may be performed by computing system 200. In various other embodiments of the present disclosure, a plurality of computing systems 200 coupled by a communication link 162 to network 160 (e.g., such as a LAN, WLAN, PTSN, and/or various other wired or wireless networks, including telecommunications, mobile, and cellular phone networks) may perform instruction sequences to practice the present disclosure in coordination with one another. Devices like the computing system 200 may transmit and receive messages, data and one or more data packets, information and instructions, including one or more programs, applications, or "apps," (i.e., application code) through communication link 162 and network interface component 202 and wireless transceiver 220. Received program code may be executed by processing device 206 as received and/or stored in memory component 208. Execution of the received program code or instructions may cause the processing device 206 to render information to the display component 210 as an interactive graphical user interface that presents information to a user of the computing system 200 and receives information and commands from the user. The received information and commands may be processed directly by the computing system 200 or communicated through the network interface controller 202 to another computing system, such as a server, for further processing.

Figure 3:
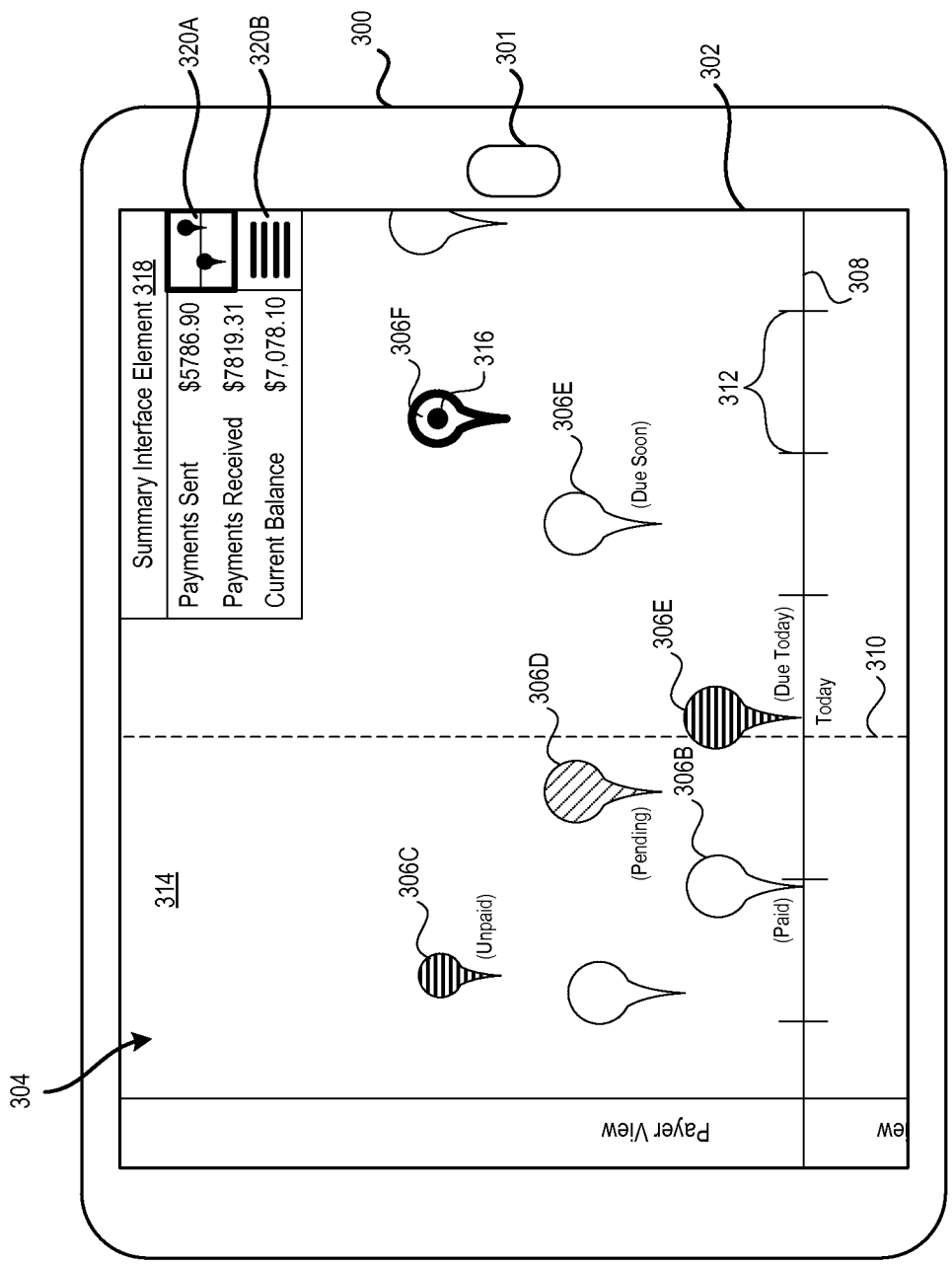
FIGS. 3, 4A, 4B, 4C, 5, 6, 7, 8, 9, 10, 11, and 12 are diagrams illustrating graphical user interfaces for an interactive transaction dashboard, consistent with some embodiments.

In referring now to FIG. 3, shown therein is a computing device 300 that is similar in many respects to the computing system 200 of FIG. 2 and to the user devices 102 and 112 of FIG. 1. For example, the computing device 300 includes a processing device, one or more memory components, and a network interface controller, a GPS device, etc. As illustrated in FIG. 3, the computing device 300 is a touch screen-based device such as a smart phone or tablet computer. However, in other embodiments the computing device 300 may be a desktop computer or laptop computer, etc. As illustrated in FIG. 3, the computing device 300 includes a hardware interface element 301 and a display 302 integrated therewith. In the illustrated embodiment, the hardware interface element 301 is one or more buttons provided on the computing device 300 or on a coupled component, such as a keyboard or mouse. As illustrated, the display 302 is a touch screen display that permits a user, such as the user 101 or 111 to select interface elements such as buttons, dials, sliders, drop-down menus, and other interactive interface elements to provide information and commands or requests to the computing device 300 and/or applications executing thereon, as well as to a remote computing device such as the dashboard server 120 illustrated in FIG. 1.

As an example, the computing device 300 may execute a dashboard application, like the dashboard application 108 described herein with respect to the system 100 of FIG. 1, which causes a graphical user interface 304 to be rendered to the display 302. The graphical user interface 304 presents financial obligations or payment obligations associated with the user of the computing device 300, e.g. user 101. In order to access the information rendered in the graphical user interface 304, user 101 may be required to enter identifying information, such as a user name and password, that may be authenticated by the computing device 300 or by the dashboard server 120 before rendering such information. In some embodiments, biometric information may be used to authenticate the user 101. Authentication may be required in order to ensure that sensitive financial information remains confidential. In some embodiments, authentication may be performed using a public key infrastructure (PKI) system that relies on upon the generation, issuance, distribution, revocation, administration and management of public and private cryptographic keys. Authentication of the user may be performed in order to authorize use of a particular user's key.

When authentication information, whether a user name/password pair and/or a public key, is provided over the network 160 to the dashboard server 120, transaction data associated with the authenticated user may be transmitted back over the network 160 to the computing device 300. The transaction data associated with a user may include transaction data describing or characterizing a plurality of individual financial transactions, such as debits or credits to an account. For example, a first transaction included in the transaction data may be described or characterized by information such as the transaction amount, the transaction receiver or recipient when the user is the payer in the transaction or a transaction payer when the user is the receiver in the transaction, a date and time of the transaction, and/or a description of the transaction. In some embodiments, the first transaction may be a scheduled transaction, i.e., a transaction that is scheduled to occur but that has not yet occurred. A scheduled transaction may not have occurred for multiple reasons, such as the time and/or date of the scheduled transaction may still be in the future or the time and date of the scheduled transaction has passed but the transaction has not been completed. Accordingly, at least some of the transactions in the transaction data may be scheduled transactions while others are unscheduled transactions such as a purchase at a convenience store. In some embodiments, the user may be able to filter between these types of transactions, such that the graphical user interface 304 may include only scheduled transactions (whether scheduled for the past, present or the future), only unscheduled transactions, or both of these types of transactions.

For example, the first transaction included in the transaction data may be included as transaction icon 306A, also referred to as transaction 306A. The transaction 306A may be a bill that is due to the user 101 at a scheduled time and/or date. The transaction 306A is represented in the graphical user interface 304 by an icon. Different embodiments of the icon or icons representing individual transactions may include different visual aspects, such as different shapes, different sizes, different colors, etc. In some embodiments of the graphical user interface 304 different transactions may be represented differently from each other. For example, the transactions illustrated in the graphical user interface 304 may vary in size according to the currency amount associated with each transaction, e.g., a transaction involving $1000.00 may be larger than a transaction involving $100.00. The difference in size may be directly proportional or indirectly proportional, according to different embodiments. Additional transactions included in the graphical user interface 304 include a paid transaction 306B that occurred in the past, an unpaid transaction 306C that was scheduled to have occurred at a time that is now past, a pending transaction 306D, and a transaction 306E that is scheduled to be performed today. The pending transaction 306D may be a transaction for which payment has been submitted by the user 101 but for which the dashboard server 120 has not yet received confirmation from the recipient, e.g. a financial institution authorized by the recipient to receive funds, or for which the dashboard server 120 has not provided confirmation to the user device 300.

The graphical user interface 304 may present the transactions 306 along a timeline 308. An orthogonal dateline 310 is included in the graphical user interface to demarcate to the user 101 past time from current and future time. The timeline 308 further includes a plurality of tick marks, such as the tick marks 312 that serve to demarcate fixed periods of time. For example, each tick mark 312 may indicate a day, or a week, or a month, according to the amount of time that the user 101 has requested the presented in the graphical user interface 304. The user 101 may interact with the graphical user interface 304 to specify or select a timeframe for depiction. For example, where the display 302 is a touchscreen device, the user 101 may use a pinching motion of the fingers or in a pinching motion of the fingers to increase or decrease the amount of time represented by the timeline 308. The number of transactions 306 may be increased or decreased automatically according to any changes in the timeline 308 or settings associated with the timeline 308. For example, the user 101 may indicate by setting a setting associated with the timeline 308 that, at least upon startup of the dashboard application 108, the timeline 308 should represent a particular amount of time, such as 2 weeks for 2 months. The user 101 may further specify by setting a setting associated with the timeline 3084 by scrolling or swiping a finger on the graphical user interface 304 to adjust the proportion of the transaction field that is associated with future time as opposed to pass time. For example, the user 101 may swipe on the display 302 to move the dateline 310 to the left thereby increasing the proportion of the transaction field 314 that shows future time. The user may be able to adjust the time. Represented in the graphical user interface 304 such that the dateline 310 moves out of the view illustrated therein.

As shown in the graphical user interface 304, the transaction 306C is smaller than the transaction 306B (or in other words, the icon representing the transaction 306C is smaller than the icon representing the transaction 306B). This difference in size may represent a difference in the value at issue in each of these respective transactions. Additionally, the colors of the transactions 306B, 306C, and 306D are different as represented by the different hashing shown in FIG. 3. The colors of the transactions 306C and 306E may alert the user 101 that the transaction 306D is due today and that the transaction 306C is overdue or is past schedule, unpaid, and not pending. Additionally, the transactions the 306 may be distributed in the transaction field 314 along the dateline 310 (orthogonally to the timeline 308) to provide further information characterizing the individual transactions. For example, the transaction 306F is further away from the timeline 308 than the transaction 306A, which in turn is further away from the timeline 308 than the transaction 306E. For transactions in the future (e.g., to the right of the dateline 310), as the date of payment approaches the dateline 310, the transactions may be rendered closer to the timeline 308. For transactions in the past (e.g. to the left of the dateline 310), the distance of a particular transaction may depend on the status of that transaction. As illustrated in FIG. 3, the transaction 306C is the furthest away from the timeline 308 to further draw the attention of the user 101 to that transaction. The paid transaction 306B is dropped down to the timeline 308, while the pending transaction 306D is shown in an intermediate position. In some embodiments, whenever a transaction associated with a payment obligation on the part of the user 101 is updated to indicate the transaction has been paid, the icon representing that transaction may move toward and/or contact the timeline 308.

Some embodiments of the graphical user interface 304 may provide a proximity or location-based indicator associated with one or more of the transactions 306. For example, the transaction 306F is illustrated as including a bolded outline 316 and a mark centered therein to show that an entity associated with the transaction 306F is physically located nearby the device 300. For example, the device 300 and the user 101 may be near a person associated with the transaction 306F. The person may be a friend of the user 101 to whom the user 101 owes money. The friend may be a user of the dashboard server 120 as well. For example, the friend may be the user 111 illustrated in FIG. 1. The dashboard application 108 may cause a notification to appear in the graphical user interface 304 or in a graphical user interface associated with another application running on the user device 102. By informing the user 101 of his or her proximity to the user 111, the interactive dashboard may facilitate the payment of any obligations between the two users. In some embodiments, the entity associated with the transaction 306F may be a business having a physical location. When the user 101 brings the user device 300 within a specified radius of the business associated with the transaction 306F, the outline 316 may appear around the transaction 306F and/or a notification, such as a push notification may be presented to the user 101 in the display 302. Additionally, a sound may also be produced by the user device 300 to alert the user 101.

The user interface 304 further includes a summary interface element 318 that provides summarized financial information to the user 101. As illustrated in FIG. 3, the summary interface element 318 includes a portion summarizing payments sent by the user 101, another portion summarizing payments received by the user 101, and yet another portion communicating the current balance associated with the user 101 by the dashboard server 120. The payments sent and payments received shown in the summary interface element 318 may be associated with the timeline 308. For example, the payments sent shown in the summary interface element 318 may include all payments by the user 101 within the time period illustrated in the graphical user interface 304. Accordingly, when the user 101 adjusts the time period shown by timeline 308, the payments sent and payments received may be updated to reflect the adjusted time period. The current balance shown in the summary interface element 318 may be a summation of balances of the plurality of financial accounts associated with the user 101. Accordingly, the current balance may incorporate one or more savings account balances, credit card account balances, balance associated with an online or electronic payments processor or services (e.g., a PayPal® account and/or a Venmo® account), and other accounts.

The summary interface element 318 further includes interface elements permitting the user 101 to toggle or select between graphical representations of the transactions 306. As shown, a map view or timeline view icon 320A is selected and a list view icon 320B is not selected.

Figure 4A:
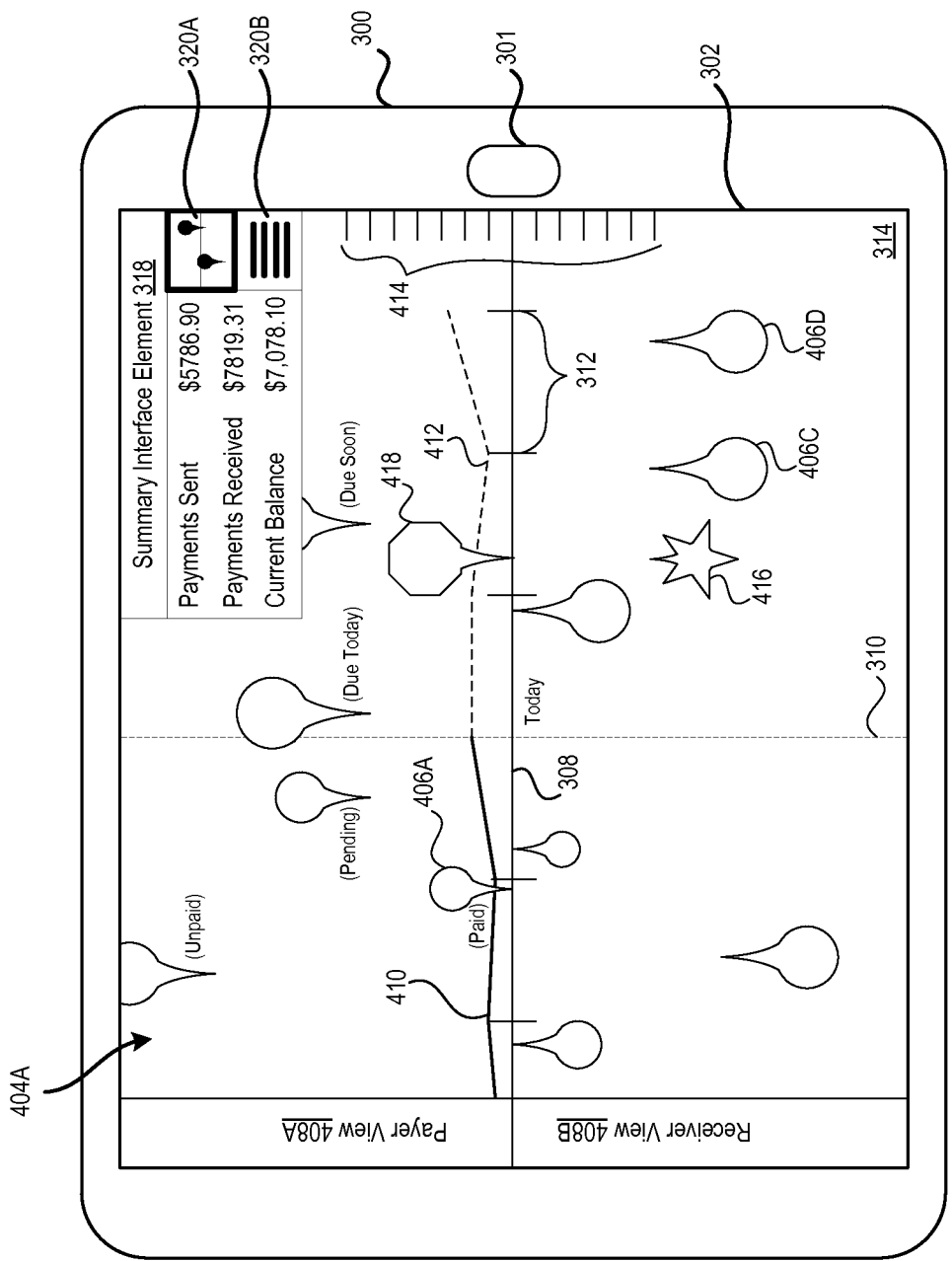
Figure 4B:
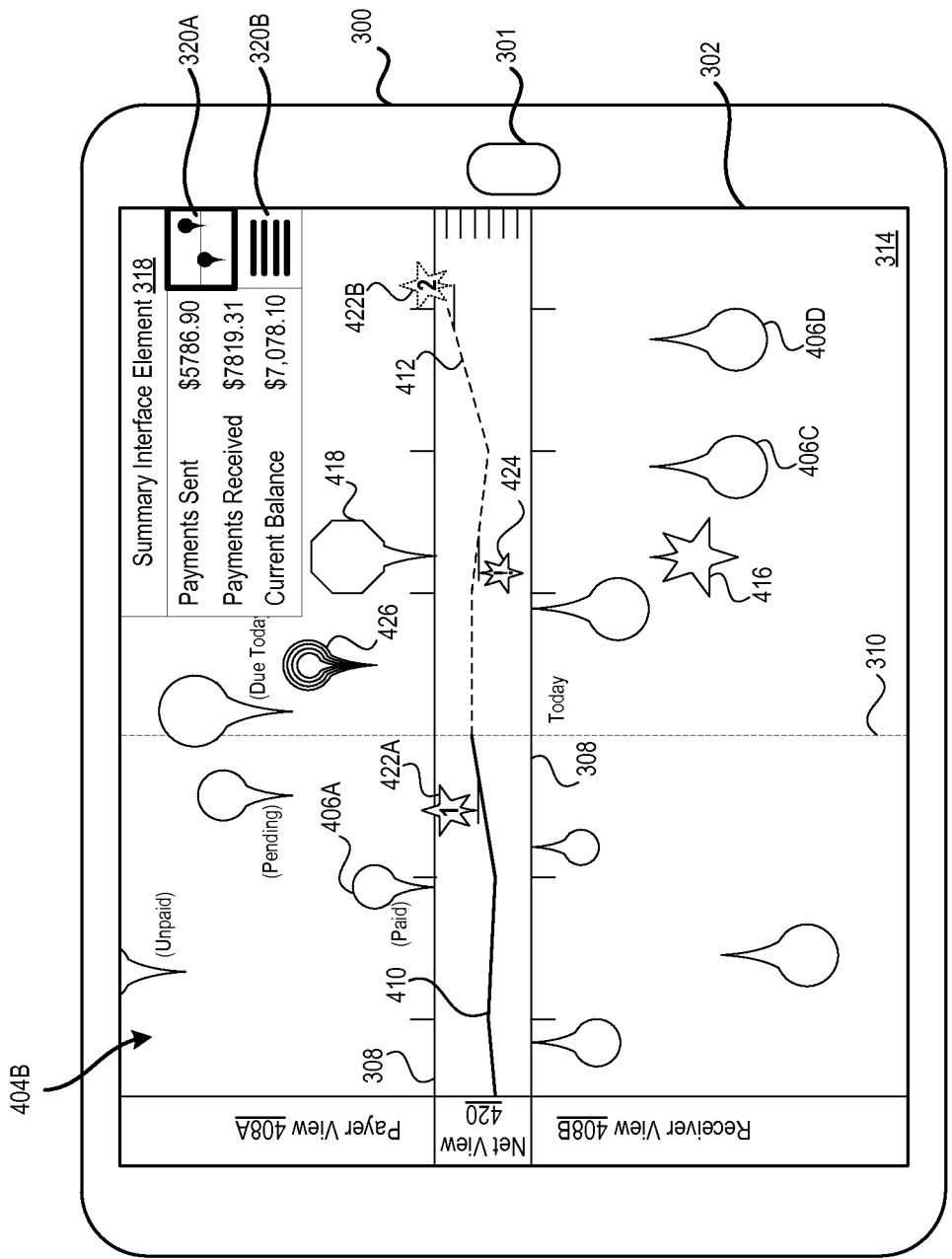
Figure 4C:
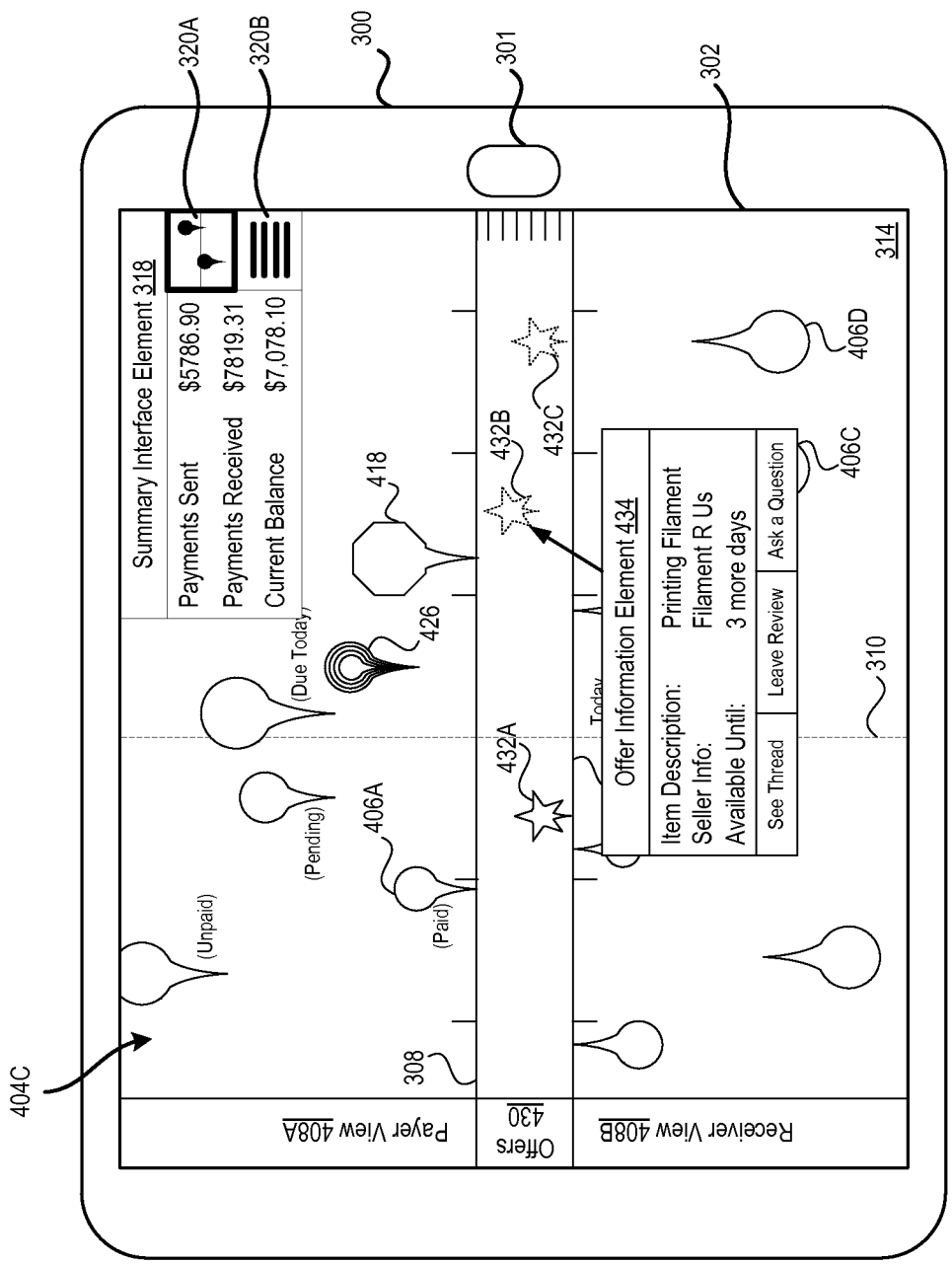

Referring now to FIGS. 4A, 4B, and 4C, shown therein are variations of a graphical user interface 404 that shares many features described herein with respect to the graphical user interface 304 of FIG. 3. The variations of the graphical user interface 404 are referred to herein as graphical user interfaces 404A, 404B, and 404C. Accordingly, the graphical user interface 404 includes a plurality of transactions 406 arranged in a transaction field 314 with respect to a timeline 308 and a dateline 310. The graphical user interface 404 further includes a summary interface element 318. The transaction field 314 of the graphical user interface 404 is subdivided into a payer view 408A and a receiver view 408B. The payer view 408A includes transactions 406 that represent payment obligations of the user 101 to another entity. The receiver view 408B includes transactions 406 that represent payment obligations to the user 101 by other entities. For example, the transaction 406A may be associated with a utility bill paid by the user 101. Because the bill has been paid, the transaction 406A is illustrated as contacting or proximate the timeline 308. The transaction 406B may be associated with a payment to the user 101 by another. For example, the user 101 may teach music lessons, and the transaction 406B illustrates a payment by one of the students of the user 101 provided in exchange for one or more lessons. As shown in FIG. 4, the transaction 406B has been paid and so is positioned proximate the timeline 308.

As an example, the tick marks 312 on the timeline 308 may represent weekly periods. The transactions 406B, 406C, and 406D may be an associated series of recurring transactions, such as weekly payments for music lessons provided by the user 101 to a student. As illustrated in the graphical user interface 404, the transactions 406C and 406D have been scheduled but have not yet been paid. This may be because the associated lessons have not yet occurred or because the user 101 may require students to pay for only a certain number of lessons in advance. The graphical user interface 404 also includes a line 410 representing a running balance associated with the accounts of the user 101. The running balance shown by line 410 is illustrated as a solid line while a predicted balance is illustrated by the dashed line 412 to reflect that the balance is being predicted based on transactions scheduled to occur during the future period or periods. At the edge of the graphical user interface 404 is a plurality of marks 414 that may be associated with specific balance values. For example each mark may be associated with $1000, such that marks 414 provide a scale by which to interpret the lines 410 and 412.

The graphical user interface 404 may be manipulated by the user 101 to show only the payer view 408A or only the receiver view 408B. For example, the user may swipe on a touch screen display 302 or may manipulate scrollbars or other elements using a mouse or other input device. Accordingly, by manipulating the user interface 404, the user 101 may alter the interface to approximate the graphical user interface 304 of FIG. 3.

The graphical user interface 404 further may further include icons associated with non-transactions such as advertisements or offers for the user 101 and/or goals of the user 101. For example, the user 101 may be able to set a goal for saving a specific amount in a specific savings account. The goal icon 416 visually represents that goal in the graphical user interface 404. The goal has a deadline allowing it to be positioned appropriately along the timeline 308. When the goal is satisfied, the goal icon 416 may drop to the timeline 308. By selecting on the goal icon 416, a goal interface may be displayed permitting the user to receive visual information about the goal and/or to perform modifications thereto. For example, the user 101 may manually indicate that the goal has been satisfied. Additionally, the graphical user interface 404 depicted in FIG. 4 includes an offer icon 418 that is associated with an offer available to the user 101. The offer may be a commercial offer such as an advertisement for car insurance, a checking account, an investment account, or foreign item included in a shopping history of the user 101 on one or more electronic shopping services. The offer icon 418 may be for a product for which the user 101 has searched using a search engine. The offer icon 418 may also present an opportunity for the user 101 to donate to a charity with which the user 101 may or may not have a prior connection, such as a prior donation. Selecting on the offer icon 418 may cause additional information regarding the offer or opportunity to be displayed in the graphical user interface 404. The user may be able to make a donation or purchase by interaction with the icon 418.

In some embodiments, the icon 418 may be a financial information alert icon that provides an alert to the user 101 with respect to a piece of financial information. For example, the user 101 may request to be alerted when there is a change in a widely used financial indicator such as an interest rate (Federal Reserve rate or LIBOR rate). In some embodiments, the financial alert information associated with the financial information alert icon may be a detected change in mortgage rates or property or sales tax rates. In this way, the user 101 may be informed of an impending financial change and may adjust budgets or delay or accelerate purchases. For example, the dashboard server 120 may generate a recommendation to the user 101 that the user 101 request that the scheduled transaction 406D be moved up in time. The dashboard server 120 may access additional information such as the age or the user 101 or the age of user's children in provide alerts and or recommendations regarding goals or individual transactions.

Referring now to FIG. 4B, the graphical user interface 404B shown therein further includes a net view area 420 that provides a designated area in the graphical user interface 404B for the display of the running balance line 410 and the predicted balance line 412. In other embodiments, the net view area 420 may include other specific information. For example, the user 101 may be able to select a specific linked account to monitor the cash flows associated with that account. Additionally, the user 101 may be able to set specific goals associated with an account or with the net of the associated, linked accounts. For example, the user 101 may set a goal to increase the running balance of all the linked accounts. As part of this goal, the user 101 may be able to set a plurality of smaller goals. As shown in the net view area 420, the user 101 has a staged goal represented by goal icons 422A and 422B. The goal icons 422A and 422B are stages of a larger goal. The dashboard server 120 may automatically, or upon request by user 101, create staged goals when a larger goal is set. For example, the goal icon 422A may represent a running balance of $2,500, while the goal icon 422B represents a running balance of about $3,500. As shown in FIG. 4B, the first goal icon 422A indicates that the goal has been achieved, while the second goal icon 422B indicates that the second goal is predicted to be achieved. However, the predicted balance line 412 indicates that the running balance is likely to dip below the amount indicated by first goal icon 422A. Accordingly, the graphical user interface 404B includes a goal warning icon 424 to indicate that the user 101 is predicted to fall down below the goal of having a running balance of $2,500.

FIG. 4B also includes a social transaction icon 426. The social transaction icon 426 is associated with and represents either a transaction recommended by a contact of the user 101, such as contact indicated by the dashboard server 120 based on user account information 125, or a contact from a third-party social network. The social transaction icon 426 may also indicate a transaction that one or more social contacts of the user 101 have taken. For example, if two friends of the user 101 both purchase tickets for a particular concert, the dashboard server 120 may recommend based on the completed transactions of the two friends recorded in user account information associated with each of the two friends, that the user 101 buy a ticket to the same concert. The user 101 may be able to select the social transaction icon 426 and may, thereafter, be presented with a graphical user interface element or elements allowing the user 101 to complete the same transaction by interacting with the graphical user interface 404B.

Referring now to FIG. 4C, shown therein is a graphical user interface 404C that is similar to the graphical user interfaces 404A and 404B and other graphical user interfaces described herein. The graphical user interface 404C includes an offers area 430 in which sponsored transactions may be presented to the user 101. Exemplary sponsored transaction icons 432A, 432B, and 432C are illustrated. The size and shape of the sponsored transaction icons 432A-C may vary according to the cost of the associated transaction, according to a percent or amount of a discount compared with an undiscounted transaction, or according to other aspects. For example, a logo of a sponsoring entity may be used as a sponsored transaction icon. The sponsored transaction icons 432A-C may be selected by the dashboard server 120 based on the past purchases of the user 101 in some embodiments. However, in other embodiments, the past purchases of the user 101 may be used to determine what sponsored transaction icons are presented to a particular user.

When the user 101 touches or otherwise selects one of the available sponsored transaction icons 432B and 432C, the user device 300 may request additional information over the network 160 from the user dashboard server 120. The dashboard server 120 may provide additional information, which may be displayed by the user device 300 in a graphical user element, such as the offer information element 434. As illustrated, the offer information element 434 provides information regarding the offer, such as the item at issue in the potential transaction, a price, an identity of the seller unless anonymous, and an availability period. Additionally, the offer information element 434 may include buttons by which the user 101 may be able to access a thread of information submitted by other users of the dashboard server 120. The user 101 may be able to leave a review or ask a question by selecting other associated buttons or interface elements. In this way, the dashboard server 120 may provide a forum in which users of the dashboard server 120 can communicate regarding sponsored transactions.

Figure 5:
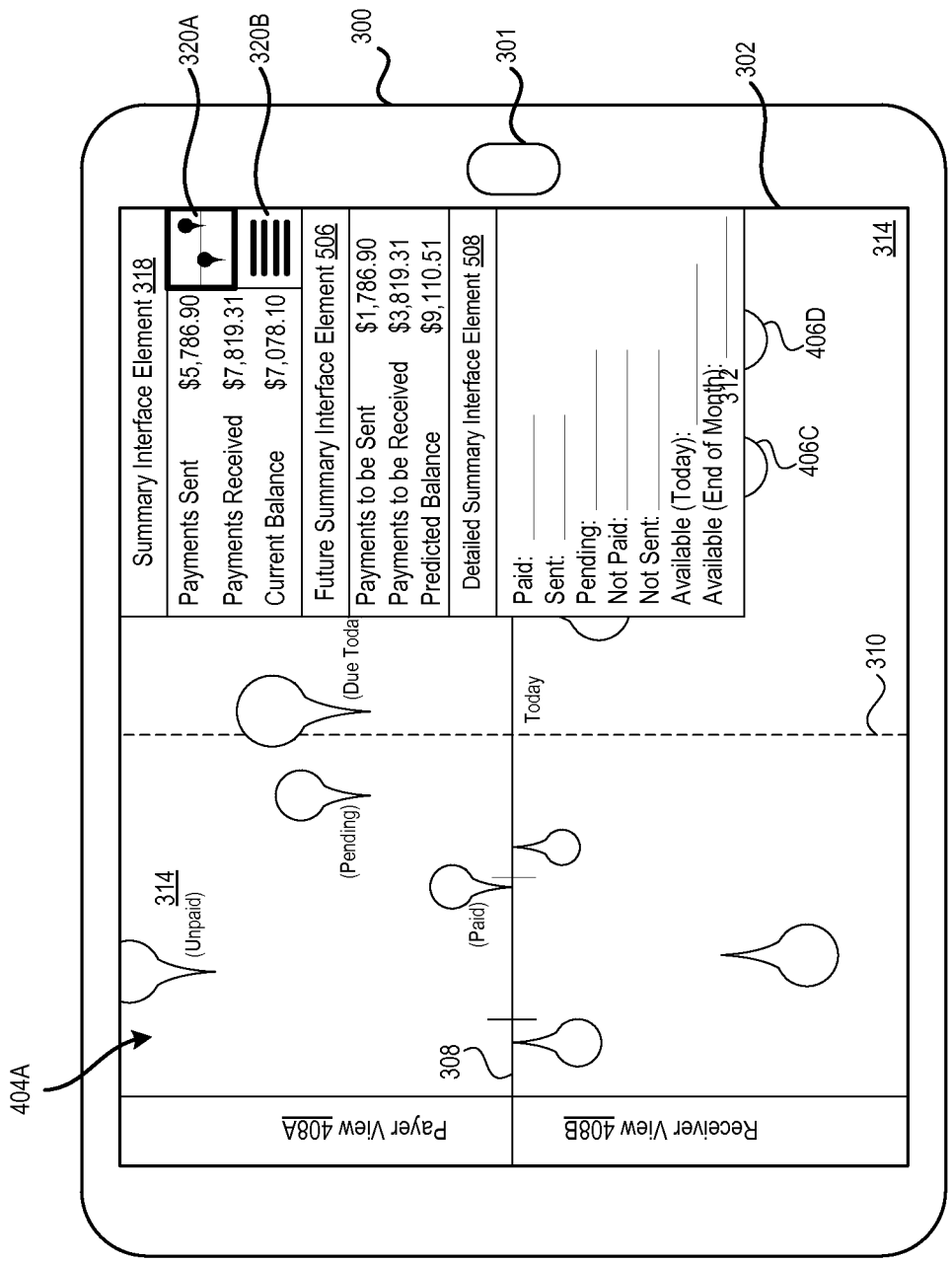

Referring now to FIG. 5, shown therein is a graphical user interface 504 that shares many of the features described herein in connection with FIGS. 3 and 4. The graphical user interface 504 illustrates additional summary interface elements not depicted in FIGS. 3 and 4. FIG. 5 illustrates a future summary interface element 506 and a detailed summary interface element 508 that provide additional information to the user 101 through the graphical user interface 504. The future summary interface element 506 includes transactions that are scheduled to occur in the future. For example, the future summary interface elements 506 may factor in the scheduled transactions 406B, 406C, and 406D when totaling up the "payments to be received" for presentation in the future summary interface element 506. Similarly, transactions that represent payment obligations on the part of the user 1012 with other entities may be combined for presentation as the "payments to be sent." These values, the "payments to be sent" and the "payments to be received" may be combined with the current balance of the summary interface element 318 to provide the "predicted balance" shown in the future summary interface element 506. The predicted balance depends on transactions that have occurred and transactions that are scheduled to occur or an otherwise anticipated. The predicted balance may also reflect goals, such as a savings goal associated with a particular expenditure. For example the predicted balance may be based on a user's goal of saving for a down payment on a car at a certain amount each month for a certain number of months.

Graphical user interface 504 further includes the detailed summary interface elements 508 which includes a breakdown of components included in the determination of the "payments to be sent" and "payments to be received" of interface element 506. Accordingly, the detailed summary interface element 508 may include a total of transactions paid, a total of transactions sent, a total of pending transactions, a total of transactions that have not been paid, the total of transactions that have been sent, and an available balance specific to the current time and an available balance predicted for the end of the month. The future summary interface element 506 and the detailed summary interface element 508 may appear in the graphical user interface 504 when an interaction on the part of the user 101 is detected that indicates a request for this information. For example, the user may swipe down on the summary interface element 318 to cause the future summary interface element 506 to appear. Similarly, the user may swipe down on the future summary interface element 506 to request the display of the detailed summary interface element 508. Alternatively, a long swipe down on the summary interface element 318 may cause both the future summary interface element 506 and the detailed summary interface element 508 to appear. The user 101 may request that the elements 506 and 508 disappear by swiping up words on the elements. In other embodiments, keystrokes or drop-down menus may be used to cause the display or cause the hiding of the future summary interface element 506 and/or the detailed summary interface element 508.

Figure 6:
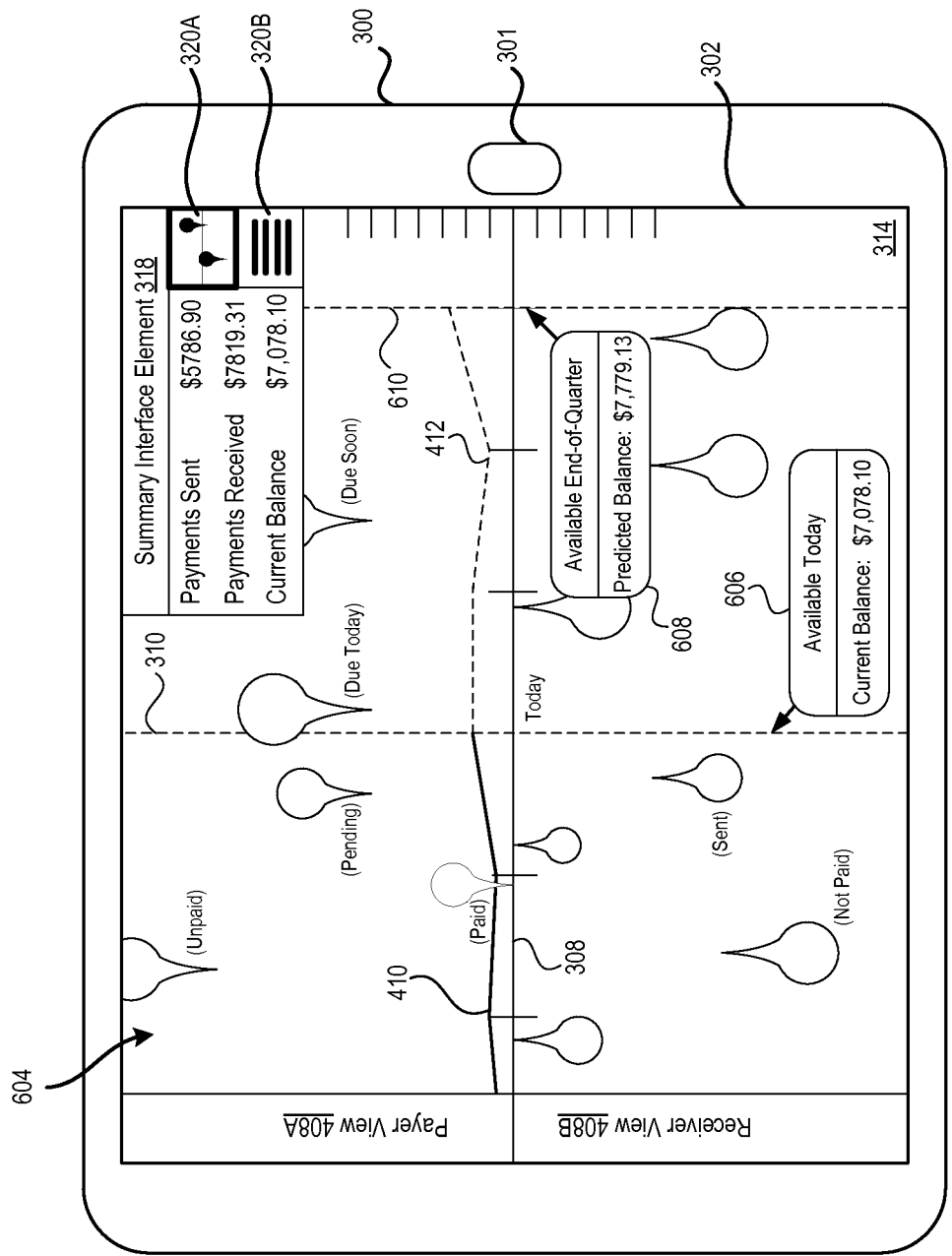

Referring now to FIG. 6, shown therein is a graphical user interface 604 that shares many of the features described herein with reference to FIGS. 3, 4, and 5. The graphical user interface 604 includes the dateline 310 and an additional dateline 610. The dateline 610 may be included periodically such as quarterly, or may be requested by the user 101 by interaction with the associated tick mark 312. For example, the user may click or otherwise select the tick mark 312. In response, the dashboard application 108 may cause the additional dateline 610 to appear in the graphical user interface 604. In some embodiments, the datelines 310 and 610 may be interactive elements. For example, the user 101 may select the dateline 310 by clicking thereon, touching a portion of the display 302 displaying the dateline 310, etc., and thereby request and overlaid balance element 606 to appear in the graphical user interface 604. The balance element 606 indicates a balance of all the connected accounts of the user 101. While this information is also included in the summary interface element 318, in some embodiments of the graphical user interface 604, the summary interface element 318 may not be present. Similarly, by selecting or interacting with the additional dateline 610, the user may request the display of an overlaid predicted balance element 608. The balance element 608 may appear over the transaction field 314 and may provide an indication of a predicted balance associated with the time indicated by the additional dateline 610. Accordingly, graphical user interface 604 may provide for interactive tick marks on the timeline 308. The user may be able to select any tick mark 312, causing an additional dateline 610 appear. The selection of the dateline 610 may serve as a request from the user 101 to display the predicted balance element 608 shown in FIG. 6.

Figure 7:
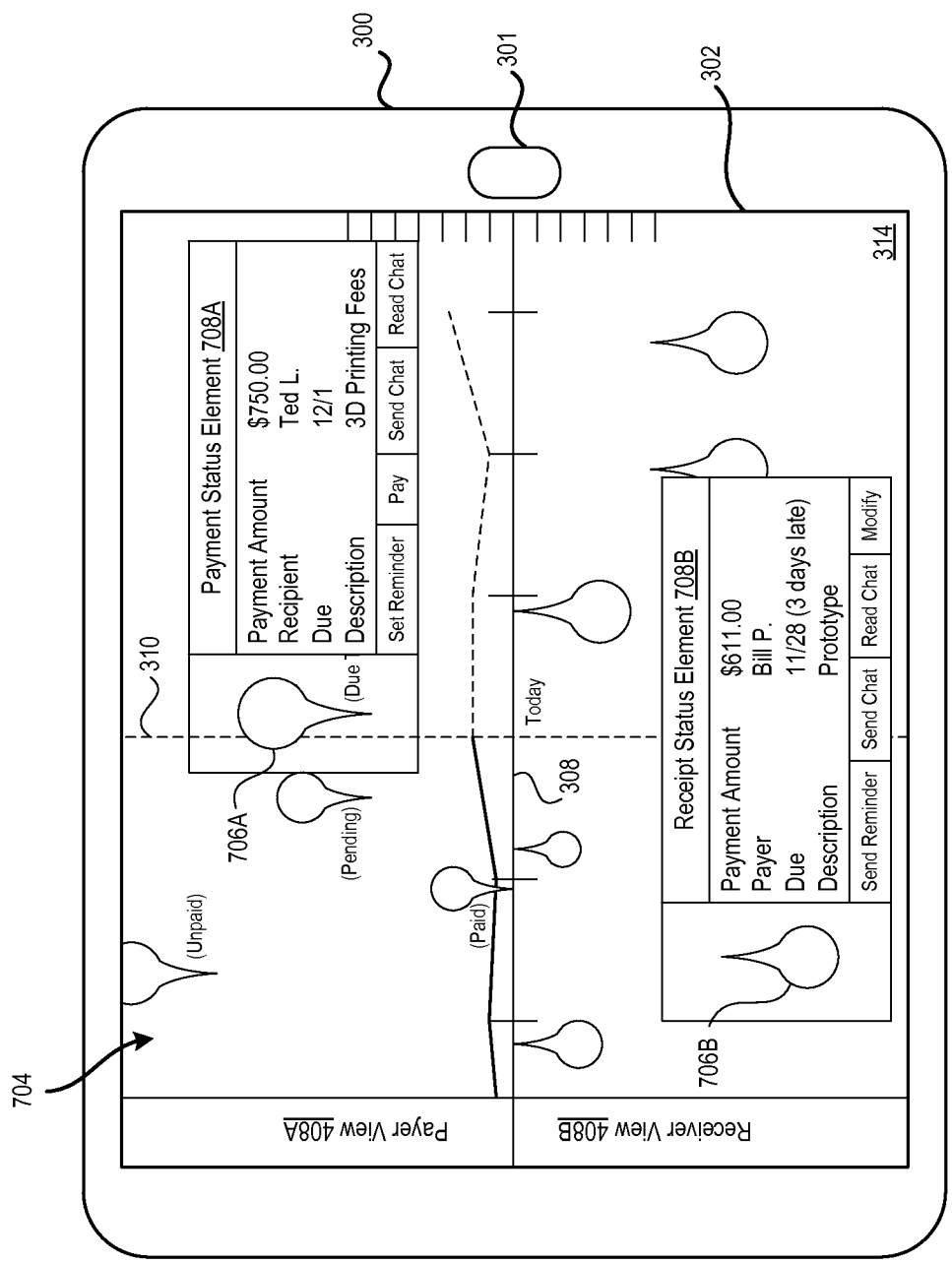

Referring now to FIG. 7, shown therein is a graphical user interface 704 that shares many features described herein in connections with FIGS. 3-6. The graphical user interface 704 depicts a result of an interaction between the user and a particular transaction icon. By selecting the transaction 706A, the user 101 may request a display of at least some of the underlying transaction data associated with the transaction 706A and options or commands associated with the transaction 706A. Similarly, the user 101 may request a display of underlying transaction data associated with the transaction 706B and additional options and commands associated therewith. Upon selecting either or both of the transaction 706A and 706B, a transaction status element may appear over the transaction field 314. The transaction status element may be a payment status element or a receipt status element depending on whether the payment obligation associated with the particular transaction is a payment obligation of the user 101 or a payment obligation to the user 101. Transaction information and options associated with the transaction 7046A are presented in the payment status element 708A. Transaction data is presented in the payment status element 708A and indicates that the payment amount associated with transaction 706A is $750. The recipient is also indicated in the payment status element 708A. The recipient may be a person, in this case "Ted L.," while in other transactions the recipient may be a business.

The payment status element 708A further includes a due date associated with the transaction 706A and a description providing a brief explanation of the object of the transaction. The receipt status element 708B includes similar information and further describes how late payment is for the transaction 706B. The receipt status element 708B includes a payment amount, and identification of a pair, a due date, and a description. Some embodiments of the payment status element 708A and the receipt status element 708B may include more or less information than is illustrated in FIG.

7. Each of the status elements 708A and 708B includes additional commands or options that are selectable through the graphical user interface 704 by the user 101. The additional commands may be presented in the graphical user interface 704 as buttons or other selectable elements. Each of the elements 708A and 708B includes a command to set a reminder regarding the associated transaction. After selecting the button to "set reminder," the user 101 may be prompted to set a reminder for himself or herself or to set a reminder for another user, such as the user 111. For example, when the user 101 selects the set reminder button presented in the payment status element 708A, the user 101 may select options to set a reminder for himself or for herself to pay the bill. Using the receipt status element 708B and the "send reminder" button, the user 101 may send a reminder to the payer associated with the transaction 706B.

Additionally, the status elements 708A and 708B include selectable elements related to the exchange of messages. The dashboard application 122 and the dashboard server 120 may enable the users 101 and 111 to exchange messages or chats regarding particular transactions. For example, when the user 101 selects the "send chat" button in the payment status element 708A, the graphical user interface 704 may present the user 101 with a dialogue box that includes a text field into which the user 101 may enter the text to be communicated to the user 111 (e.g., "Ted L."). After entering text in the text field, the user 101 may select a "send chat" button. The dashboard application 108 then sends the message to the dashboard server 120 which relays the message to the dashboard application 118 on the user device 112, which is associated with user 111. In other embodiments, the data associated with the message may be sent from the user computing device 102 over network 160 to the messaging server 150, which in turn transmits the message over the network 160 to the user device 112. The dashboard application 118 thereafter presents the message in a user interface similar to the graphical user interfaces described herein.

When a message is received that is associated with a particular transaction, the icon representing that transaction may be altered, such as by the inclusion of a "badge," by a change in color, by a change in outline, or by another interface indicator to alert the user to the message. For example, the payment status element 708A includes a "read chat" button that may be highlighted or otherwise altered to indicate at least one message associated with the transaction 706A is available to be read by the user 101. For example, the user 101 may use the chat system associated with the transaction 706A to ask the intended recipient "Ted L." to adjust the due date or the payment amount. The user 111 may use the chat system to respond to the request. While the transaction 706A is illustrated in the payer view 408A of the graphical user interface 704 for the user 101, the transaction 706A may appear in the receiver view 408B of the graphical user interface 704 for the user 111. In order to adjust or modify a transaction, the user 111 may select the "modify" button or element included in a receipt status element 708B associated with the transaction 706A. Users of the interactive dashboard described herein may modify a transaction by adjusting the payment amount, the due date, or by substituting a series of transactions for a single transaction. For example, a single payment may be modified by interaction with a graphical user interface to result in a series of payments of equal, lesser, or greater value.

The payment status element 708A further includes a "pay" button. Upon selection of the "pay" button the user may be presented with an additional interface and alternate interface through which the user 101 may direct payment to satisfy the obligation associated with transaction 706A.

Figure 8:
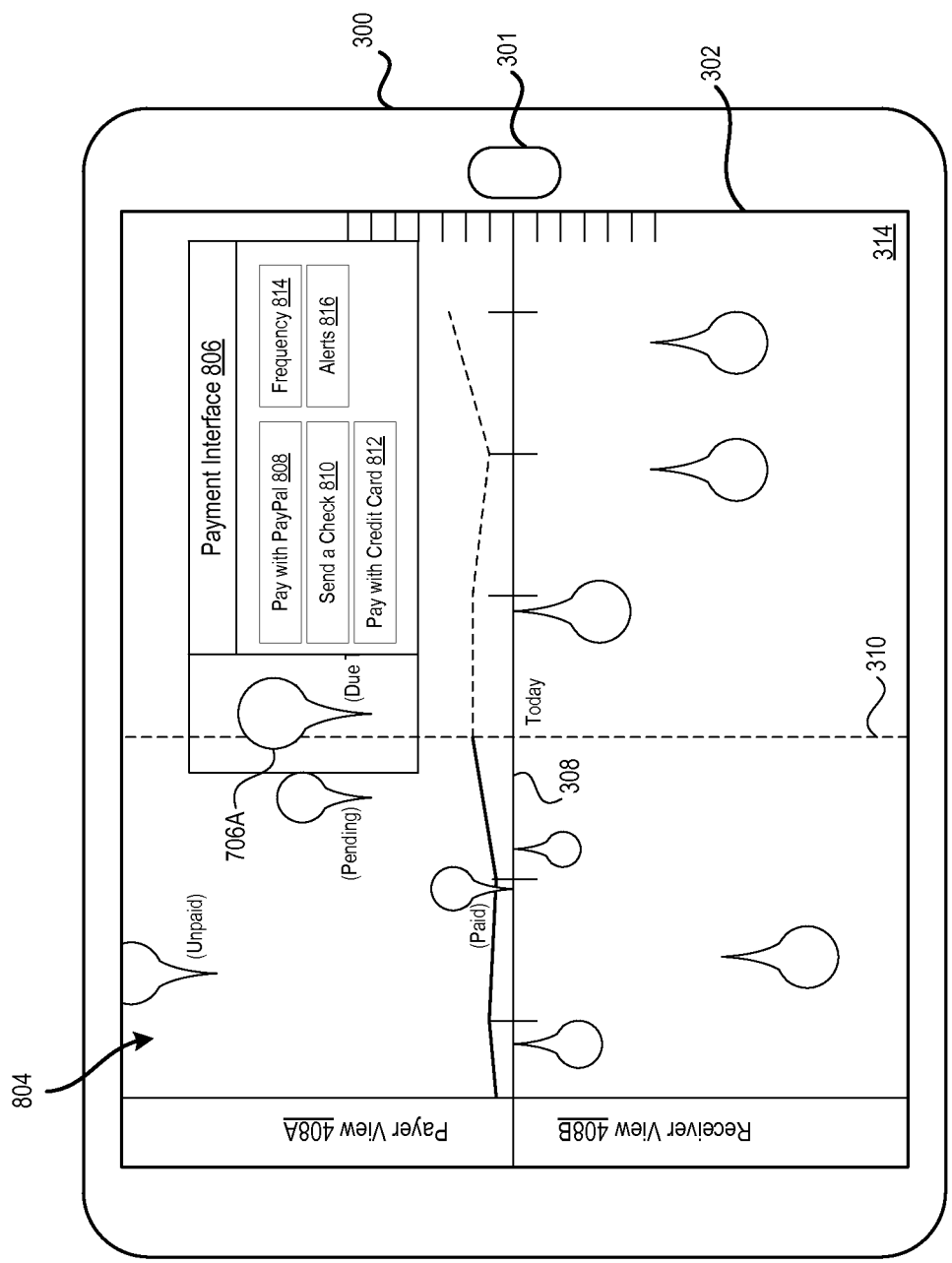

Referring now to FIG. 8, shown therein is a graphical user interface 804 that includes a payment interface 806. The payment interface 806 is illustrated in association with the transaction 706A, such that payments directed through the payment interface 806 are associated with transaction 706A. When the user 101 has connected a plurality of financial accounts to the dashboard server 120 by providing authentication information thereto, the user may be presented with an option associated with each financial account. For example, the payment interface 806 includes a "pay with PayPal®" button 808. By selecting the "pay with PayPal®" button 808, the user 101 may cause a request to be transmitted from the user device 300 to a payment server 130 associated with the user's PayPal® account. Other online or electronic accounts may be used in place of or in addition to PayPal®. The payments interface 806 further includes a "send a check" button 810, a "pay with credit card" button 812, as well as a "frequency" button 814 and then "alerts" button 816. When the user device 300 detects a selection of the "pay with credit card" button 812, the user device 300 to communicate with the financial account server 1402 request that funds be sent from an account associated with user 101 to an account associated with user 111. The account associated with user 111 may be an account with the same institution or with a different institution or service. When the user device 300 detects a selection by the user 101 of the "send a check" button 810, the user device 300 may communicate with the dashboard server 120 and/or the payment server 130 to direct that a check, a paper check or an electronic check, be sent to the recipient associated with the transaction 706A.

When the user selects the "frequency" button 814, the user may be presented with further graphical interface elements that enable the user to program or direct a frequency at which the payment, like that associated with the transaction 706A, is to be made. For example, if the transaction 706A is a recurring transaction, the user 101 may select the "frequency" button 814 and thereafter adjust options and commands directing that a similar transaction (e.g. a similar amount to a similar recipient) be performed as directed. For example, the user 101 may direct payments to be made monthly for a time or for a specified number of payments. Selection of the "alerts" button 816 may present the user 101 with options to set alerts associated with the transaction 706A. For example, the user 101 may set an alert associated with transaction 706A and cause a notification to be displayed in a graphical user interface of the user device 30 on or before the due date.

Figure 9:
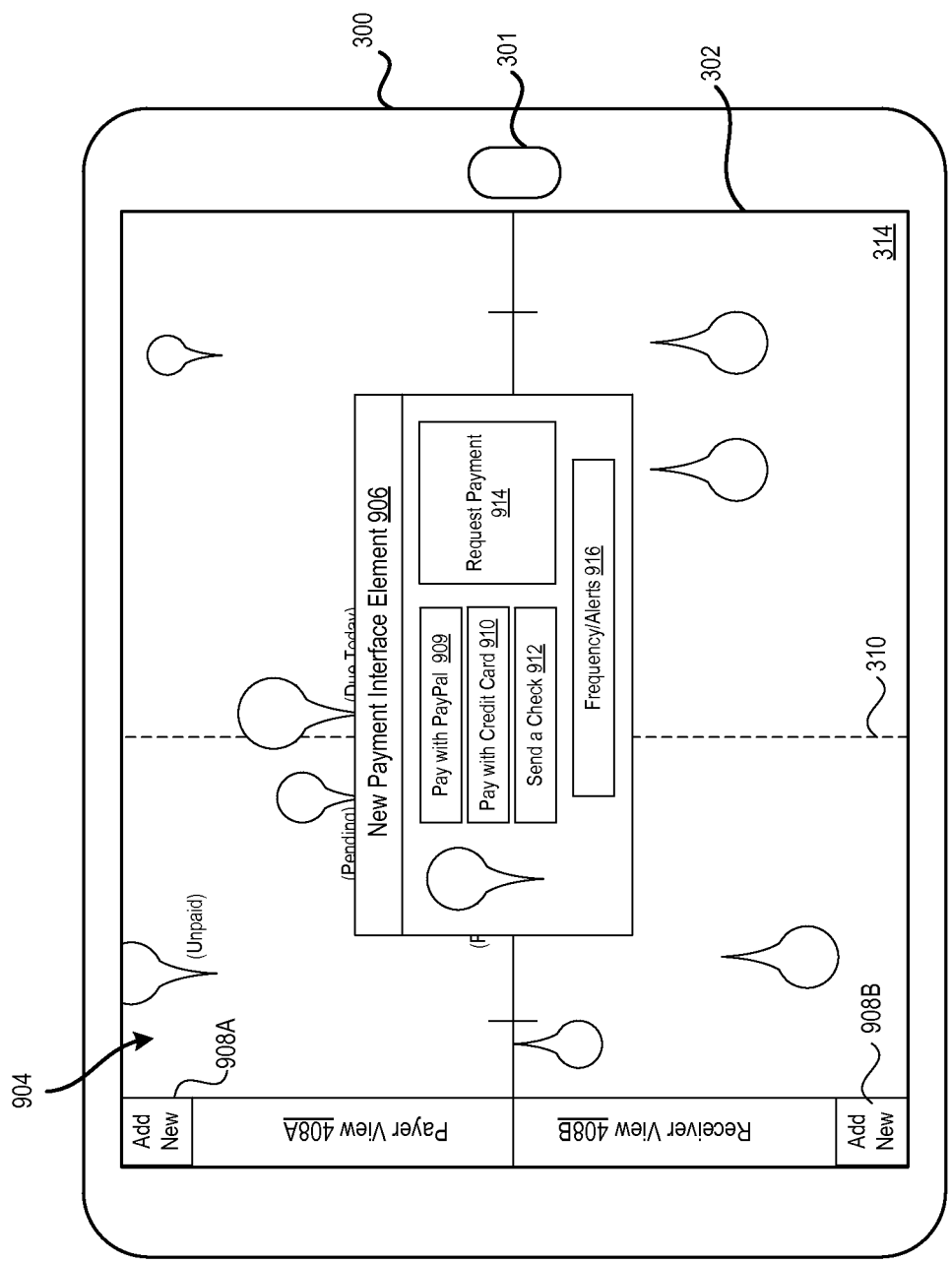

Referring now to FIG. 9, shown therein is a graphical user interface 904 that is similar in many respects to the graphical user interfaces presented in FIGS. 3-8 as described herein. FIG. 9 illustrates a new payment interface element 906 through which the user 101 may request or command the creation of a new transaction. The new payment interface element 906 may appear when the user 101 selects one of the "add new" buttons 908A or 908B. In some embodiments of the graphical user interface 904, only a single "add new" button 908 is present. The new payment interface element 906 includes some similarities to the payment interface 806 of FIG. 8. The new payment interface element 906 may permit the user 101 to pay immediately or to schedule a payment as well as to request payment from another. As shown in new payment element 906, a "pay with PayPal®" button 909 is included as is a "pay with credit card" button 910 and a "send a check" button 912. The "pay with PayPal®" button 909 may be button that enables the user 101 to use an electronic, Internet-based payment service, like PayPal® or any other comparable service. The new payment interface element 906 further includes a request payment button 914 and a frequency/alerts button 916. Upon selection of one of the buttons 908, 910, 912, 914, or 916, an additional interface element associated with the selected button may be presented in the graphical user interface 904.

Figure 10:
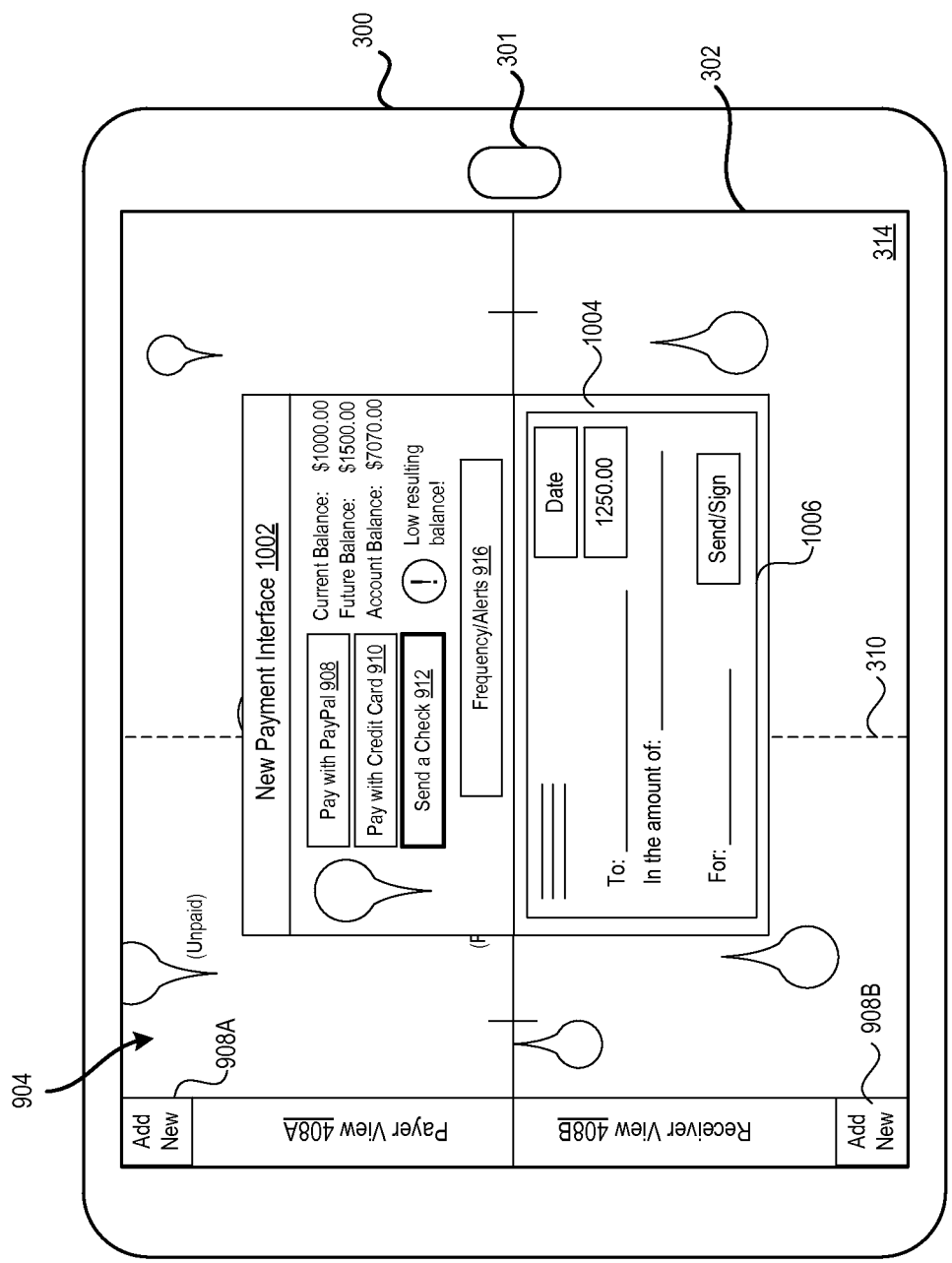

Referring now to FIG. 10, shown therein is a new payment interface element 1002 after selection of the "send a check" button 912. As illustrated in FIG. 10, when the "send a check" button 912 is selected, an additional interface portion 1004 is rendered to the display 302. The additional interface portion 1004 includes a depiction of a check 1006. The check 1006 is an interactive interface element by which the user 101 may enter information in a check-like format. Accordingly, the check 1006 includes fields for the date, fields for the amount of the check, a "to:" field, a "for:" field, and a send/sign button. Upon completion of the fields of the check 1006, the user 101 may select the send/sign button to request that an analogous check be sent to the entity indicated in the "to:" field. In some embodiments of the interactive dashboard system, when the user selects the send/sign button an electronic check is sent that withdraws funds from a checking account of the user 101 linked to the interactive dashboard system. Additionally, in some embodiments, the interactive dashboard system communicates with a check printer to print a corresponding check on paper and cause the paper check to be sent to the intended recipient of the check. The funds associated with the check may be obtained from a financial account other than a checking account. For example, the interactive dashboard system may withdraw funds from a credit card account or an electronic payments account of the user 101 equal to the amount indicated in the check 1006. The check may be sent with routing numbers such that the funds for the check are obtained from an account owned or operated by the entity that controls the dashboard server 120 and that provides the dashboard applications 108 and 118 shown in FIG. 1. In this way, the interactive dashboard system 100 may permit users that do not have a checking account to send a physical check to satisfy a payment obligation.

Also shown in FIG. 10, when any of the buttons 908, 910, or 912 is selected by the user 101, the request payment button 914 shown in FIG. 9 may be removed and replaced with account information 1008. The account information 1008 may facilitate the user 101 in understanding the effects of sending and signing the check 1006. In some embodiments, the account information 1008 may update based on the amount of money indicated in the check 1006; while in other embodiments, the account information may be static as of the time at which the button 908, 910, or 912 is selected. Additionally, in some embodiments, a warning 1010 may be provided to the user 101 through the new payment interface 1002. The warning 1010 may include a warning symbol and/or a textual warning.

Figure 11:
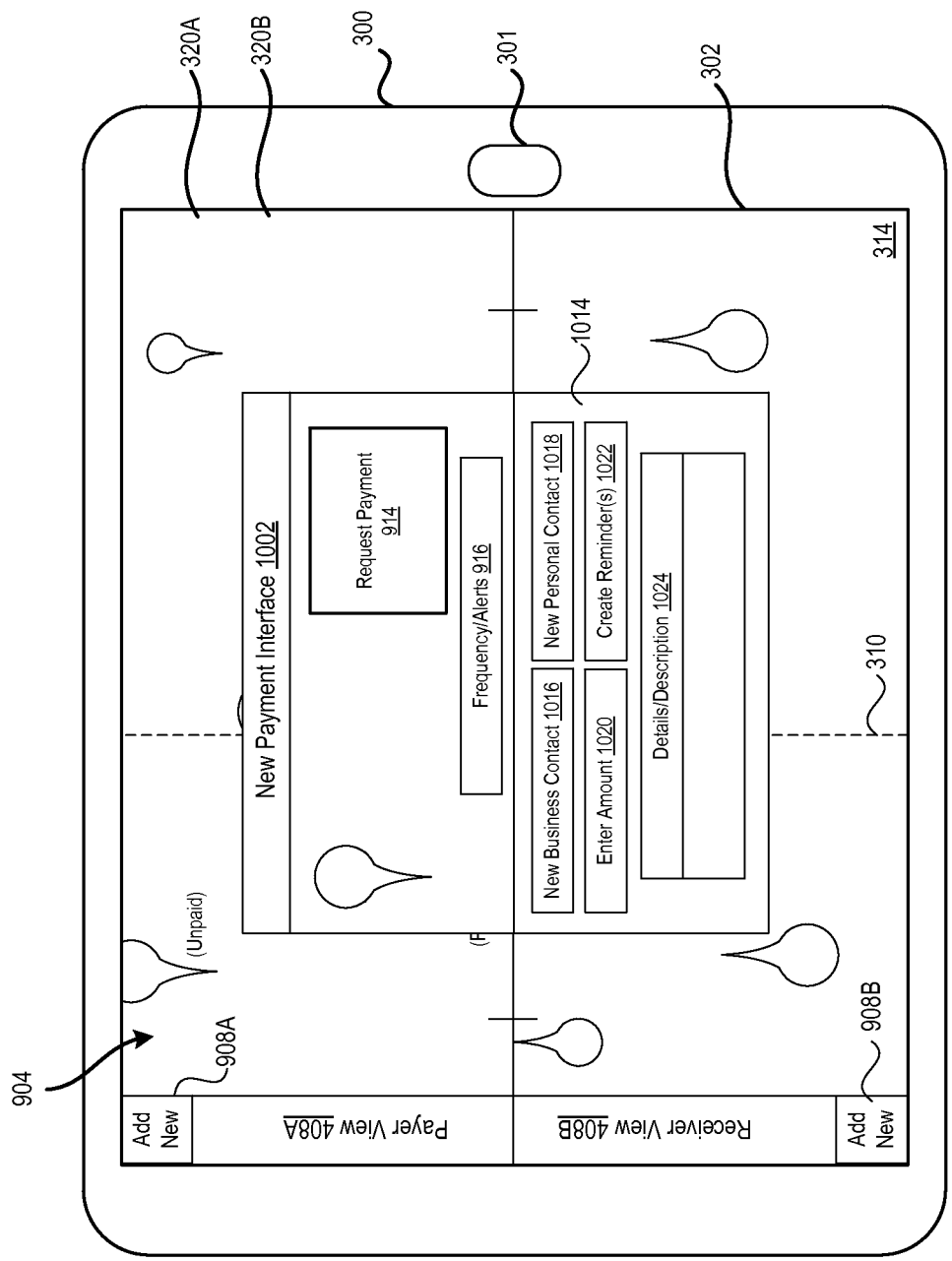

Referring now to FIG. 11, shown therein is the new payment interface 1002 that results when the user selects the request payment button 914 also shown in FIG. 9. After the user device 300 detects the selection of the request payment button 914, the additional portion 1014 may be rendered in the display 302. The additional portion 1014 includes several interface elements that when manipulated by the user 101 permits the user to request payment and thereby to create a transaction that will appear in the transaction field of the user 101 and of the entity from which payment is requested when the entity is also a user of the interactive dashboard system 100. By selecting the "new business contact" button 1016, the user 101 may be presented with a text field in which to enter information associated with the new business contact. For example, the user 101 may enter information associated with the contact such as a name, and address, a bank account number, an electronic payments account identifier, a phone number, and email address, and other information. Similarly, the user 101 may select the new personal contact 1018 and be presented with interface elements by which to enter the name, address, bank account number, electronic payments account identifier, phone number, email address, and/or other information of the new personal contact. Embodiments of the new payment interface 1002 with the additional portion 1014 may further include interface elements through which the user may select existing contacts recognized by the interactive dashboard system 100. In some embodiments, a list of contact associated with the user may appear in a user interface element. The list may be a listing of names or may be a collection of graphical profile images associated with the contacts. The list of contacts may be ordered alphabetically or by frequency or recency of past transactions.

The user may select the enter amount button 1020 in order to enter the amount associated with the transaction and may select the "create reminders" button 1022 in order to create reminders for himself or herself or for the entity from whom the payment is being requested. The additional portion 1014 further includes a details/description element 1024 in which the user 101 may enter text or other multimedia information such as a photo or video to describe the object of the payment. For example, the details/description element 1024 may include text that says "for music lessons." By using the new payment interface 1002 and the additional portion 1014, the user 101 may be able to request payment from another entity. When the other entity is a user of the interactive dashboard system, like the user 111 of FIG. 2, the notification may be sent to that user through the dashboard application 118 to communicate the request for payment. In situations in which the entity from which payment is being requested is not a user of the interactive dashboard system 100, the request for payment may be communicated by an email or other communication sent by the dashboard server 120.

Figure 12:
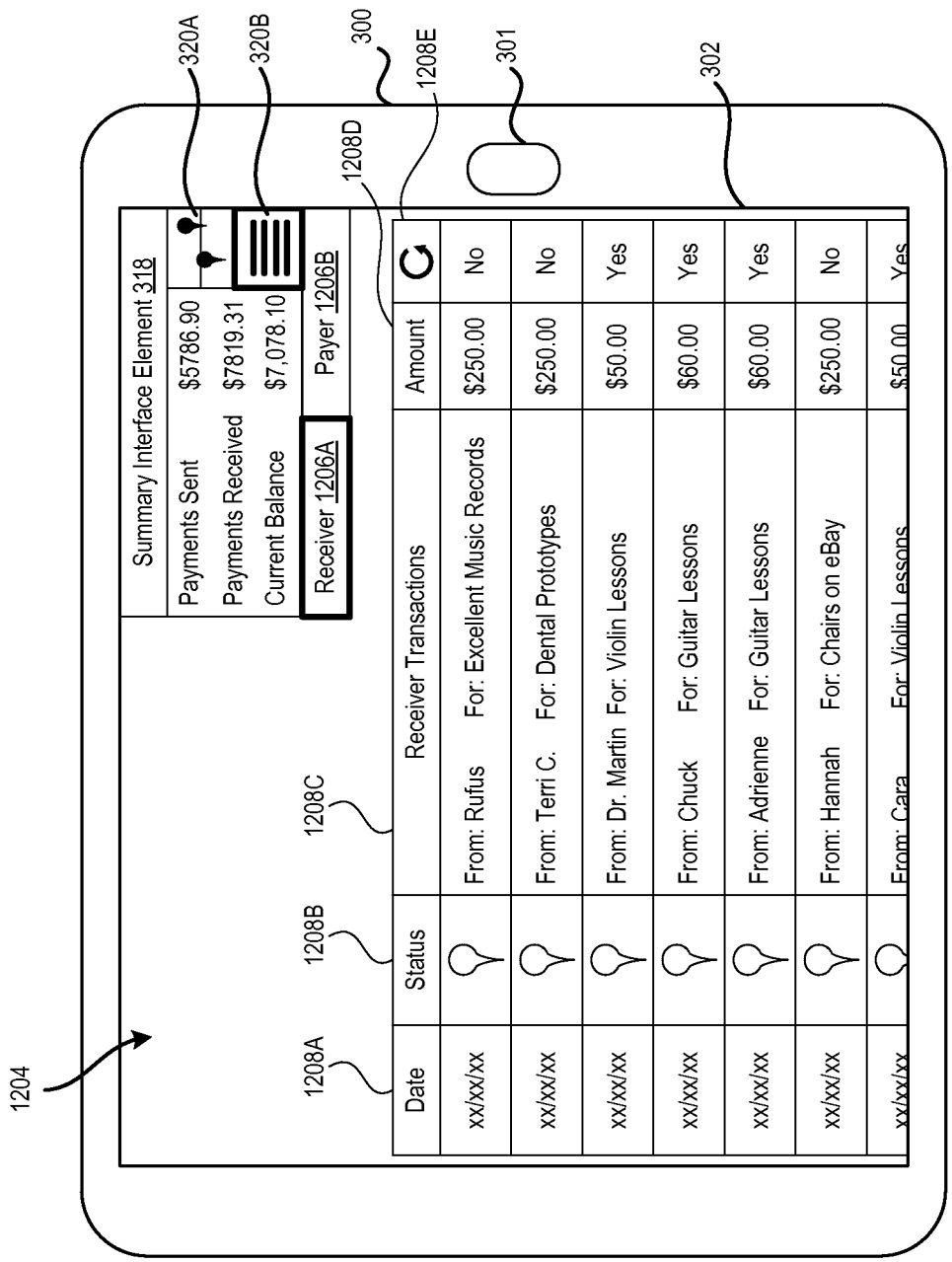

Referring now to FIG. 12, shown therein is a graphical user interface 1204. The graphical user interface 1204 illustrates a plurality of transactions in a list view. The graphical user interface 1204 may include the summary interface element 318 with the list view icon 320B selected. When the list view icon 320B is selected, a receiver view button 1206A and a payer view button 1206B may be rendered in the display 302. As shown in FIG. 12, the user 101 has selected the receiver view button 1206A. Accordingly, payment obligations or transactions are shown in which the user 101 has an expectation to receive money from another entity. The list view presented to the user 101 in the graphical user interface 1204 rendered by the user device 300 may include a plurality of fields for each listed transaction. As shown, each transaction includes a date field 1208A, a status field 1208B, and a receiver transaction field 1208C that may include an identifier of the entity (e.g., an individual, a business) that is under at least a purported obligation to pay the user 101. The receiver transaction field 1208C may also include, as illustrated in FIG. 12, a description of the object of the transaction, e.g., for music lessons, for furniture, etc. The list view of the graphical user interface 1204 further includes an amount field 1208D and a recurrence field 1208E. The recurrence field 1208E provides the user 101 with an indication of whether or not each transaction is an individual occurrence of a series of scheduled, recurring transactions. When the user 101 selects the payer view button 1206B, similar fields are presented; however, the list view includes a payer transaction field rather than the receiver transaction field 1208C. The payer transaction field may include similar information, such as description of the object of the transaction and an identifier of the entity to which the user 101 is under at least a purported obligation to provide a payment.

While the graphical user interfaces 304, 404, 504, 604, 704, 804, 904, 1002, and 1204 are referred to as discrete interfaces, features of each of these user interfaces may be combined with features of one or more others in order to provide the user 101 with an interactive dashboard to facilitate understanding and management of the cash flow of the user 101. The interactive dashboard associated with the graphical user interfaces also permits the generation of payment obligations that the user 101 owes to others and payment obligations that others owe to the user 101. Where the other party of a transaction is not a user of the interactive dashboard system 100, payment obligations may be sent to the user as an email, an SMS, a push notification, or as an invoice in the mail, etc. Accordingly, the graphical user interfaces illustrated in FIGS. 3-12 may be combined in many different ways to provide such features to the user 101 and to facilitate the interactions between the dashboard application 108 executing on the user device 102 and the dashboard server 120 and any other associated servers or services.

Figure 13:
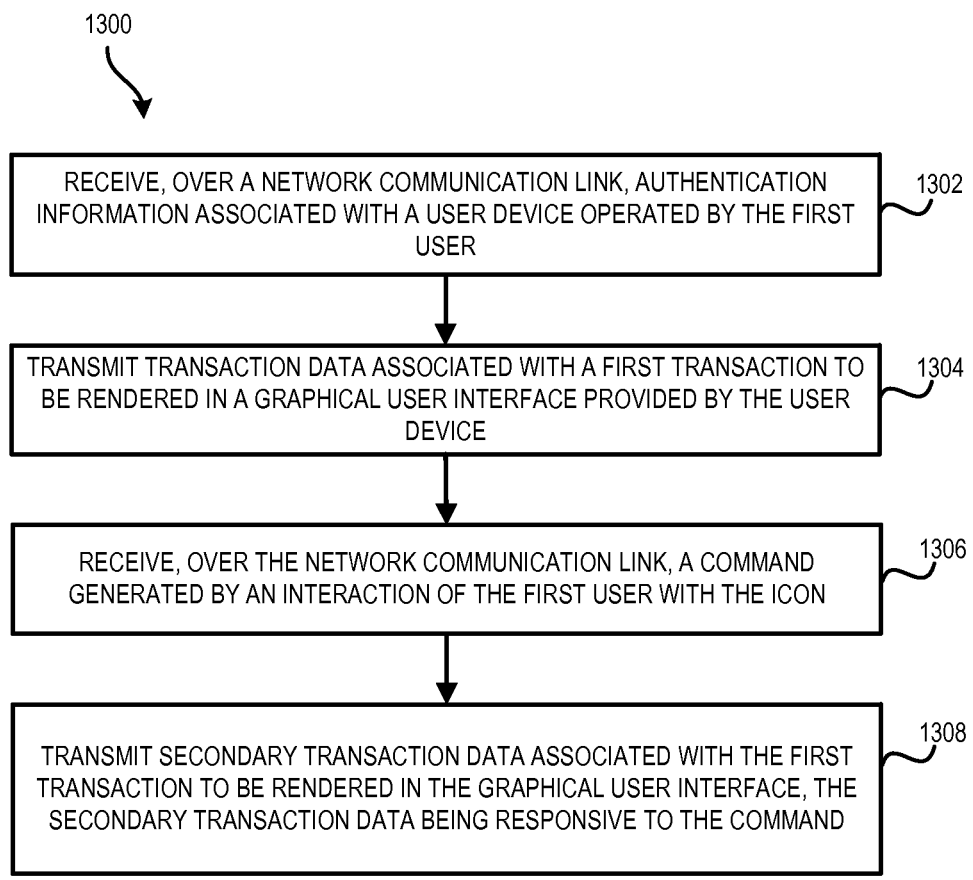
FIG. 13 is a flowchart illustrating a process for providing an interactive transaction dashboard, consistent with some embodiments.

Referring now to FIG. 13, shown therein is a flowchart illustrating a method 1300 of providing an interactive dashboard system, including aspects of the interactive dashboard system 100 of FIG. 1 as described herein. The method 1300 is illustrated as a series or collection of steps or operations. Embodiments of the method 1300 may include fewer operations than are presently illustrated in FIG. 13. Additionally, embodiments of the method 1300 may include additional operations before, after, in between, or as part of the enumerated steps. Each of the steps is performed by a hardware component of a computer system such as the computer system 200 of FIG. 2. For example, an operation of "receiving" or "transmitting" may be performed by a processing device in communication with a network interface component such as the processing device 206 configured to communicate through the system bus 204 and the network interface controller 202 of FIG. 2. Additionally, information used in the performance of the method 1300 may be received via a wireless transceiver, a GPS device, or other sensor components. In some embodiments, information may be retrieved from a memory component 208. Graphical user interfaces may be rendered to a display component 210 and may be configured to receive input from a user, such as the user 101, via one or more input component 212.

Embodiments of the method 1300 may begin at step 1302 when a processing device receives, over a network communication link, authentication information associated with a user device operated by a first user. For example, the dashboard server 120 may receive authentication information from the user device 102 through the network 160 as shown in FIG. 1. The authentication information may be a username and password of the user 101 in some embodiments. As noted, the authentication information may be based on or retrieved in connection with biometric information, such as a match on a fingerprint scanner. Additionally, the authentication information may include a public key stored on the user device 102 in connection with the dashboard application 108. The dashboard application 108 may cause the authentication information to be sent to the dashboard server 120.

At step 1304, the processing device transmits transaction data associated with a first transaction to be rendered in a graphical user interface provided by the user device. For example, the dashboard server 120 may transmit user transaction data 127 associated with the user 101 to the user device 102. The transaction data may include information describing or characterizing a plurality of financial transactions associated with the user 101. The plurality of financial transactions may include transactions associated with payment obligations of the user 101 to other entities and transactions associated with payment obligations to the user 101 on the part of other entities. The transaction data may include dates, amounts, a description of the other party to the transaction, a description of the transaction and other information. The user transaction data may include an indication, for each payment obligation of the first user and each payment obligation to the first user, whether the payment obligation is not satisfied, whether the payment obligation is satisfied, and/or whether the payment obligation is scheduled to be satisfied.

The graphical user interface may be one of the graphical user interfaces illustrated in FIGS. 3-11 described herein and can be rendered by the user device 102 to a display thereof. The graphical user interface visually depicts the first transaction as an icon positioned along a visual axis element representing a period of time.

At step 1306, the processing device receives, over the network communication link, a command generated by an interaction of the first user with the icon. For example, the user 101 may select the icon with a mouse or keystroke in some embodiments. In other embodiments, the user 101 may select the icon by touching a portion of the display occupied by the icon. The selection of the icon may be interpreted by the user device 102 and the dashboard application 108 as a command to receive and display additional information regarding the first transaction. Additionally, the command generated by the interaction of the first user with the icon may be a command to pay an amount associated with the transaction to a recipient associated with the transaction. The command to pay the amount may be a command to pay the amount by one of the options described herein, such as to pay by check, to pay by an electronic financial account, to pay by credit card, to pay by debit card, etc. When the command is received by the dashboard application 108, the command may be relayed to the dashboard server 120 in the form of a request for additional information or a request to perform a payment.

At step 1308, the processing device transmits secondary transaction data associated with the first transaction to be rendered in the graphical user interface. The secondary transaction data may be responsive to the command. For example, the dashboard server 120 may send secondary transaction data in the form of additional financial details regarding the transaction. The secondary transaction data may also be information associated with an additional graphical user interface or graphical user interface element, such as a payment interface, that when rendered by the user device 102 provides additional user interface elements to facilitate the creation and satisfaction of payment obligations of the user 101. The secondary transaction data may be a confirmation of a request from the user device 102 that the dashboard server 120 to perform a financial transaction. The secondary transaction information may include a display of quantitative information and at least one transaction interaction option that is selectable by the user when rendered in the graphical user interface. The method may include a step of rendering the secondary transaction information associated with the first transaction in the graphical user interface in the display.

The method 1300 may be performed in the context of an interactive dashboard system that includes a message exchange server. The received command of step 1306 may be a command to transmit a message from the first user to a second user of a plurality of users. The message may be associated with the first transaction, such that the interactive dashboard system provides a message thread or chat session for the first transaction in which parties to the transaction may communicate regarding the transaction or regarding other concerns.

The command generated by the interaction of the first user with the icon may be a command to generate a request for payment to be sent to a second user of the plurality of users or may be a command generated by an interaction of the first user with the icon is a command to schedule a reminder message associated with the first transaction to be sent to the first user or to a second user associated with the first transaction.

In some embodiments, the command generated by an interaction of the first user with the icon is a command to schedule a payment associated with the first transaction to be performed at a scheduled time with a direction for funds for the payment to be access from a first financial account of the plurality of third-party accounts. The command generated by the interaction of the first user with the icon may be a command to alter the first transaction or a command to request alteration of the first transaction.

The method may further include a step of transmitting a request for payment to a second user via a network communication link between the processing device and a user device operated by the second user and/or a step of receiving a command from the second user to direct payment to the first user and to communicate with a third-party payments server or transaction processing server, such as a financial account server, to electronically transfer funds from an account of the second user to an account of the first user.

Embodiments of the method 1300 may provide users of the interactive dashboard system with the ability to clearly visualize in a unique timeline format a plurality of transactions associated with those users. The users may be able to create payment obligations or requests, such as invoices, and communicate those to the other users or to non-users. Embodiments of the method 1300 further provide for the satisfaction of transactions by requesting and facilitating the performance of financial transactions by moving a requested or desired amount of money from one account to another. Embodiments of the method 1300 also provided for a communication tool by which parties to a transaction may discuss the transaction in a way that is directly connected to the transaction itself, thereby providing detailed records regarding each transaction for which messages are exchanged.

Some embodiments of the method 1300 include a non-transitory computer readable medium having a set of executable instructions stored thereon that, when executed by processing device, such as a processing device of the dashboard server 120 or the user device 102, cause the processing device to perform the operations described herein.

The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. A system for providing an interactive transaction dashboard, the system comprising:
 a non-transitory memory; and
 one or more hardware processors coupled to the non-transitory memory and configured to read instructions from the non-transitory memory to cause the system to perform operations comprising:
  obtaining transaction data related to a plurality of transactions associated with a first user, wherein the plurality of transactions comprises a payable transaction and a receivable transaction;
  rendering, on a first user device of the first user, the interactive transaction dashboard comprising a graphical user interface having a visual axis element representing a period of time;
  rendering a first icon representing the payable transaction of the plurality of transactions, wherein the first icon is rendered in a first size based on a first amount associated with the payable transaction, wherein the first icon is rendered at a first position on the graphical user interface on a first side of the visual axis element and having a first distance from the visual axis element based on a first payment status of the payable transaction;
  rendering a second icon representing the receivable transaction of the plurality of transactions, wherein the second icon is rendered in a second size based on a second amount associated with the receivable transaction, wherein the second icon is rendered at a second position on the graphical user interface on a second side, opposite to the first side, of the visual axis element and having a distance from the visual axis element based on a second payment status of the receivable transaction, wherein the first size and the second size are proportional to the first amount and the second amount;
  determining that a payee of the payable transaction is located within a predetermined distance from the first user device;
  in response to the determining, modifying a visual aspect of the first icon to indicate that the payee of the payable transaction is located with the predetermined distance from the first user device;
  receiving, via the interactive transaction dashboard, a selection of the first icon;
  in response to receiving the selection of the first icon, presenting, on the interactive transaction dashboard, information related to the payable transaction and a selectable element for initiating a payment for the payable transaction;
  in response to receiving a selection of the selectable element, processing a payment transaction in the first amount associated with the payable transaction to the payee; and
  in response to processing the payment transaction associated with the payable transaction, automatically modifying the first payment status by moving the first icon to a third position having a third distance smaller than the first distance from the visual axis element in the graphical user interface to represent the modified first payment status of the payable transaction.

2. The system of claim 1, wherein the operations further comprise:
  in response to receiving the selection of the first icon, presenting, on the interactive transaction dashboard a second selectable element for composing a message for a payee of the payable transaction;
  associating the message with the payable transaction; and
  transmitting the message to a second user device of the payee.

3. The system of claim 1, wherein the operations further comprise:
  detecting, via the interactive transaction dashboard, an interaction of the first user with the second icon; and
  in response to detecting the interaction with the second icon, scheduling a reminder message associated with the receivable transaction to be sent to a second user associated with the receivable transaction.

4. The system of claim 1, wherein the operations further comprise:
  detecting an interaction of the first user with a third icon presented on the interactive transaction dashboard, wherein the third icon corresponds to a second payable transaction;
  in response to detecting the interaction, scheduling a second payment transaction associated with the second payable transaction to be performed at a scheduled time; and
  moving the third icon toward the visual axis element in response to scheduling the second payment transaction.

5. The system of claim 1, wherein the operations further comprise:
  receiving, from a payor of the first receivable transaction, a message associated with the receivable transaction; and
  in response to receiving the message, altering a visual aspect of the second icon to notify the first user of the message.

6. The system of claim 1, wherein the receivable transaction is associated with a payor, and wherein the operations further comprise in response to determining that the first user device is located within the predetermined distance from a second user device of the payor, transmitting a request for payment to the second user device via a network communication link between the first user device and the second user device.

7. The system of claim 6, wherein the operations further comprise:
  receiving, from the payor via a second interactive transaction dashboard rendered on the second user device, a command to direct payment from the payor to the first user;
  in response to receiving the command, electronically transferring funds from an account of the payor to an account of the first user; and
  modifying the second payment status by moving the second icon toward the visual axis element in the graphical user interface to represent the modified second payment status of the receivable transaction.

8. The system of claim 1, wherein the information related to the payable transaction presented on the interactive transaction dashboard comprises a due date for the payable transaction, the first amount of the payable transaction, and a transaction description of the payable transaction.

9. The system of claim 1, wherein the payable transaction is a payment obligation of the first user, wherein the first position of the first icon indicates that the payment obligation is not satisfied, and wherein the third position of the first icon indicates that the payment obligation is satisfied.

10. A method of providing an interactive transaction dashboard, the method comprising:
  obtaining, by one or more hardware processors from the service provider server, transaction data related to a plurality of transactions associated with a first user, wherein the plurality of transactions comprises at least one payable transaction and at least one receivable transaction;
  rendering, by the one or more hardware processors on a display of a first user device operated by the first user, the interactive transaction dashboard comprising a graphical user interface having a visual axis element representing a period of time;
  rendering, by the one or more hardware processors in the graphical user interface, a first icon representing a first payable transaction of the plurality of transactions, wherein the first icon is rendered at a first size based on a first amount associated with the first payable transaction, wherein the first icon is rendered at a first position on the graphical user interface on a first side of the visual axis element and having a first distance from the visual axis element based on a first payment status of the first payable transaction;
  rendering, by the one or more hardware processors, a second icon representing a first receivable transaction of the plurality of transactions, wherein the second icon is rendered in a second size based on a second amount associated with the first receivable transaction, wherein the second icon is rendered at a second position on the graphical user interface on a second side, opposite to the first side, of the visual axis element and having a second distance from the visual axis element based on a second payment status of the first receivable transaction, wherein the first size and the second size are proportional to the first amount and the second amount;
  determining, by the one or more hardware processors, that a payee of the first transaction is located within a predetermined distance from the first user device;
  in response to the determining, modifying, by the one or more hardware processors, a visual aspect of the first icon to indicate that the payee of the first transaction is located with the predetermined distance from the first user device;
  receiving, by the one or more hardware processors via the interactive transaction dashboard rendered on the first user device, a command generated by an interaction between the first user and the first icon, the command comprising a request for processing a payment transaction associated with the first payable transaction; and
  in response to processing the payment transaction associated with the first payable transaction, automatically modifying the first payment status by moving the first icon to a third position having a third distance shorter than the first distance from the visual axis element in the graphical user interface to represent the modified first payment status of the first payable transaction.

11. The method of claim 10, further comprising in response to receiving a second command generated by a second interaction of the first user with the first icon on the interactive transaction dashboard, displaying quantitative information associated with the first payable transaction, wherein the quantitative information comprises at least one of a due date, the first amount, or a transaction description.

12. The method of claim 10, wherein the command comprises a selection of a particular financial account from a plurality of financial accounts associated with the first user for the payment transaction.

13. The method of claim 10, wherein modifying the visual aspect of the first icon comprises modifying a color of the first icon.

14. The method of claim 10, further comprising rendering, on the interactive dashboard interface, an alert that is not associated with any one of the plurality of transactions.

15. The method of claim 14, wherein the alert comprises at least one of an advertisement, a message related to a goal of the user, or a message related to a financial account of the first user.

16. The method of claim 10, wherein the interactive transaction dashboard further comprises a running balance view summarizing account levels of a plurality of financial accounts associated with the first user, a plurality of outstanding payments associated with the first user, and a plurality of outstanding receivables associated with the first user.

17. The method of claim 10, further comprising:
receiving, from the first user, a second command for creating a second receivable transaction associated with a payment receivable from a second user, wherein the second command is generated by a second interaction between the first user and the interactive transaction dashboard;
in response to receiving the second command, transmitting a payment request to a second user device associated with second user; and
modifying the graphical user interface of the interactive transaction dashboard by rendering a third icon representing the second receivable transaction in a fourth position of the graphical user interface corresponding to a due date of the payment obligation.

18. A method of rendering an interactive transaction dashboard, the method comprising:
rendering, by a computing device on a display of the computing device, the interactive transaction dashboard to include a graphical user interface and a visual axis element representing a period of time;
presenting, by the computing device in the graphical user interface, a first icon representing a first transaction of a user from a plurality of transactions, wherein the first icon is presented on a first side of the visual axis element to indicate that the first transaction is a payment obligation, wherein the first icon is presented at a first size based on a first amount associated with the first transaction, wherein the first icon is presented at a first position in the graphical user interface having a first distance from the visual axis element based on a first payment status of the first transaction;
presenting, by the computing device in the graphical user interface, a second icon representing a second transaction of the user from a plurality of transactions, wherein the second icon is presented on a second side opposite from the first side of the visual axis element to indicate that the second transaction is a payment receivable, wherein the second icon is presented at a second size based on a second amount associated with the first transaction, wherein the second icon is presented at a second position in the graphical user interface having a second distance from the visual axis element based on a second payment status of the second transaction, wherein the first size and the second size are proportional to the first amount and the second amount;
determining, by the computing device, that a payee of the first transaction is located within a predetermined distance from the first user device;
in response to the determining, modifying, by the computing device, a visual aspect of the first icon to indicate that the payee of the first transaction is located with the predetermined distance from the first user device;
receiving, by the computing device, a command generated by an interaction of the first user with the first icon rendered in the graphical user interface, wherein the command corresponds to a request for processing a payment transaction associated with the first transaction;
in response to receiving the command, processing the payment transaction; and
in response to processing the payment transaction, modifying the first payment status by moving the first icon from the first position to a third position having a third distance shorter than the first distance from the visual axis element to represent a change from an unpaid payment status to a paid payment status.

19. The method of claim 18, further comprising:
receiving a second interaction with of the first user with the second icon in the graphical user interface; and
in response to receiving the second interaction with the second icon, scheduling a reminder message associated with the second transaction to be sent to a second user associated with the second transaction.

20. The method of claim 18, further comprising:
receiving a message from a payor of second transaction; and
in response to receiving the message, altering a visual aspect of the second icon to notify the first user of the message.

* * * * *